United States Patent [19]

Crummer et al.

[11] 4,394,742

[45] Jul. 19, 1983

[54] ENGINE GENERATED WAVEFORM ANALYZER

[75] Inventors: Marvin R. Crummer, Tustin; Kenneth S. Gold, Canoga Park; David G. Johnson, Newhall; Tom R. Vandermeyden, Norwalk; Edmond R. Pelta, Los Altos Hills, all of Calif.

[73] Assignee: FMC Corporation, Chicago, Ill.

[21] Appl. No.: 202,516

[22] Filed: Oct. 31, 1980

[51] Int. Cl.[3] .......... G01M 15/00

[52] U.S. Cl. .......... 364/487; 364/580; 364/431.04; 73/117.3

[58] Field of Search .......... 364/580, 487, 424, 431.04; 73/117.3, 117.2; 324/379-380, 383-384, 393

[56] References Cited

U.S. PATENT DOCUMENTS

| | | | |
|---|---|---|---|
| 3,219,927 | 11/1965 | Topp, Jr. et al. | 324/73 |
| 3,247,498 | 4/1966 | Sadvary et al. | 340/213 |
| 3,485,093 | 12/1969 | Muller et al. | 73/116 |
| 3,504,164 | 3/1970 | Farrell et al. | 364/487 |
| 3,630,076 | 12/1971 | Staudt | 73/117.3 |
| 3,777,559 | 12/1973 | Rennick et al. | 73/117.3 |
| 3,815,411 | 6/1974 | Emerson | 73/117.3 |
| 3,960,011 | 6/1976 | Renz et al. | 73/116 |
| 3,969,614 | 7/1976 | Moyer et al. | 60/39.28 R X |
| 4,006,403 | 2/1977 | Olsen et al. | 324/15 |
| 4,072,851 | 2/1978 | Rose | 364/487 |
| 4,116,052 | 9/1978 | Paluka | 73/117.3 |
| 4,125,894 | 11/1978 | Cashel et al. | 364/442 |
| 4,128,005 | 12/1978 | Arnston et al. | 73/117.3 |
| 4,142,146 | 2/1979 | Schumann | 364/487 X |
| 4,194,185 | 3/1980 | Wilson | 364/487 X |
| 4,215,404 | 7/1980 | Bakhtiyarov et al. | 364/431.04 |
| 4,317,182 | 2/1982 | Takase et al. | 364/431.04 X |

OTHER PUBLICATIONS

Model 770B Programmable Diagnostic System, Prepared for United States Army Tank-Automotive Command (ATAC), Warren, Michigan, Oct. 1970.

Design Specification, General Motors Diagnostic System, Mar. 15, 1977.

First Digital Automotive Diagnostic System-Autosense, Parker et al., Feb. 23, 1976.

Economics of Universal Off Vehicle Diagnostic Techniques, Marino et al., Jul. 17, 1972.

*Primary Examiner*—Edward J. Wise
*Attorney, Agent, or Firm*—H. M. Stanley; R. B. Megley

[57] ABSTRACT

An internal combustion engine analyzer provides both data acquisition and data processing and includes an analog waveform analysis subsystem together with a general purpose background system wherein appropriate power distribution is provided for the system as a whole and peripheral equipment such as a printer, keyboard and an analog/digital CRT is also provided. The input signals to be analyzed are waveforms generally associated with internal combustion engines and peripheral equipment. Exemplary waveforms are the primary and secondary ignition waveforms. The waveforms are attenuated to reasonable levels and multiplexed to analog circuitry which serves to measure waveform magnitude at one or more sampling points along the length of the wave and to also measure the manner in which the characteristics of the waveform change. The analog measurements are digitized and coupled to a processor which in turn controls the operation of the analog circuitry. The digitized measurements together with previously entered engine identification data are analyzed by the processor to thereby control subsequent data taking and to generate appropriate maintenance and repair instructions which are communicated visually to an operator in the disclosed embodiment.

29 Claims, 17 Drawing Figures

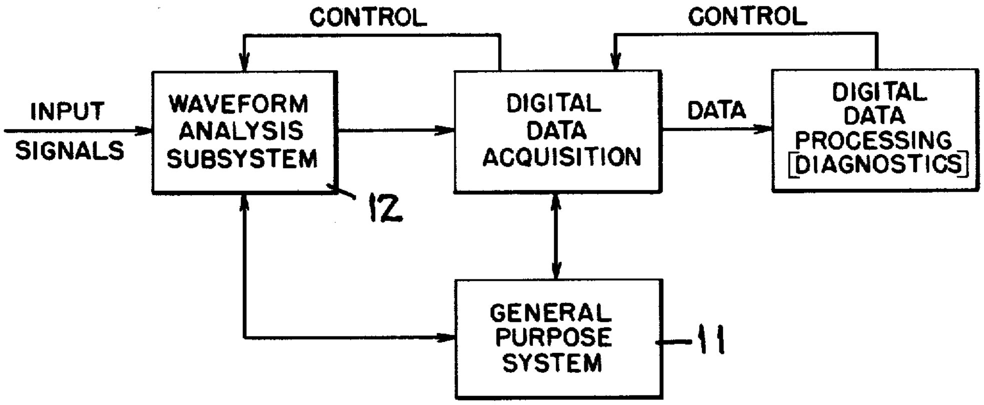
FIG_1
FIG_2
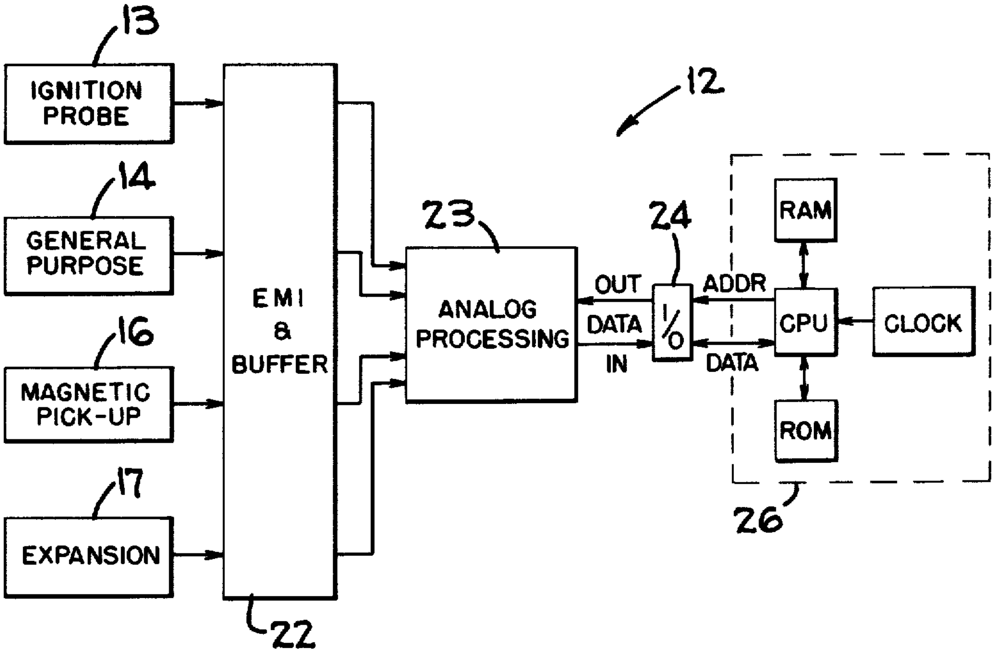

ENGINE GENERATED WAVEFORM ANALYZER

BACKGROUND OF THE INVENTION

1. Field of the Invention

This invention relates to waveform analysis for internal combustion engine ignition waveforms and more particularly to such analysis which includes as a result specific repair and maintenance instructions for the analyzer operator.

2. Description of the Prior Art

A number of references are available which describe systems including one or more transducers for sensing engine characteristics, parameters, or conditions and which include signal processors together with analog to digital converters so that the sensed engine characteristics are immediately transmuted into digital form. Displays are provided which indicate to the system operator which engine components are malfunctioning.

SUMMARY OF THE INVENTION

The invention disclosed herein relates to an internal combustion engine wave characteristic analyzer for a two dimensional wave signal wherein predetermined wave characteristic data are held in storage. Means is provided for receiving the ignition wave signal and for providing a plurality of sampled output signals corresponding to wave characteristics at a plurality of positions along the wave. Means is also provided for receiving and storing data indicative of said plurality of output signals together with means for continuously performing an analysis of the waveform utilizing ones of said plurality of output signal data, others of said plurality of output signal data and ones of said predetermined ignition wave characteristic data. The continuous analysis provides a discrete analysis signal which is coupled to means for continuously receiving and diagnosing said discrete analysis signal and for providing a diagnostic signal responsive thereto. Means is coupled to said diagnostic signal for providing an instruction output relating to operations required to retain and reestablish the predetermined wave characteristic. Means is also provided for displaying alphanumeric instructions for an operator of the analyzer.

This invention also relates to an analyzer for use by an operator in determining deviations from normal characteristics of a two dimensional waveform signal which is produced by a machine wherein the waveform signal has a substantially predetermined shape for normal operation of the machine. Means is provided for receiving and for conditioning the wave form signal. Means is coupled to said means for receiving for sampling said conditioned waveform signal and for providing data signals resulting therefrom. Means is also provided for continuously processing said data signals, for continuously controlling said means for receiving and conditioning, and for continuously diagnosing said data signals with reference to the normal operation of the machine and others of said data signals. Means for interpreting said diagnosis is provided along with means for generating instructions for appropriate repairs to maintain and reestablish the normal machine operation. Means for communicating the instructions to the operator is also provided.

BRIEF DESCRIPTION OF THE DRAWINGS

FIG. 1 is a block diagram of a system including the features of the present invention.

FIG. 2 is a block diagram of a wave form analysis subsystem.

DESCRIPTION OF THE PREFERRED EMBODIMENT

Figure 3:
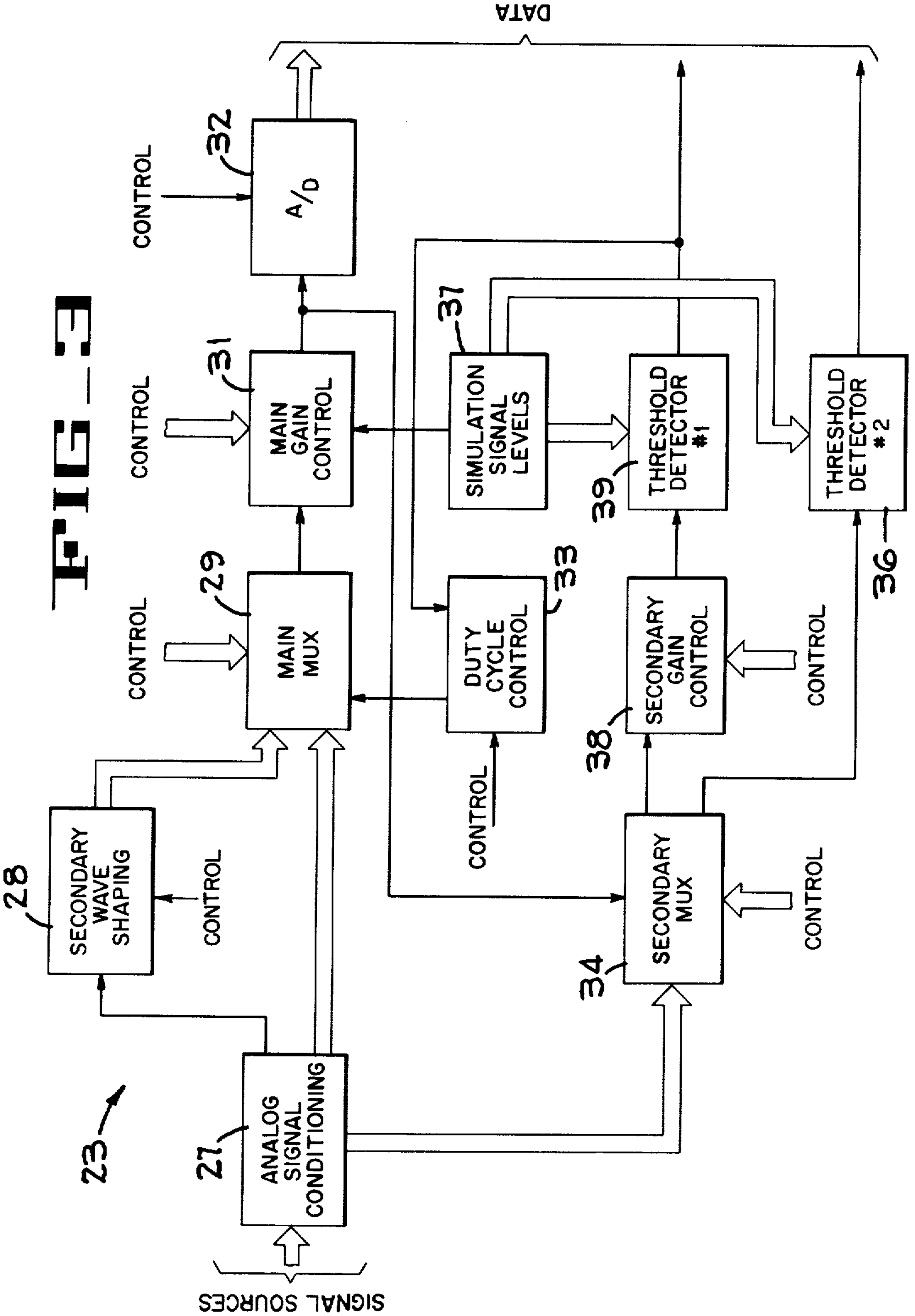
FIG. 3 is a block diagram of the analog processing section of the present invention.

FIG. 1 depicts a system wherein the invention disclosed herein may be utilized. The system of FIG. 1 relates to an internal combustion engine analyzer wherein digital data acquisition and digital data processing functions are performed under the control of a central processing unit included in a general purpose system 11. The data acquisition and data processing functions are controlled by the processor to be synchronous with the operation of an internal combustion engine being diagnosed. The manner in which the system is synchronized with the engine under test may be as described in U.S. Pat. No. 3,619,676, Pelta et al. The processor also cooperates with a waveform analysis subsystem 12 which operates to receive engine and engine peripheral equipment generated waveform input signals. The waveform analysis subsystem is controlled by the processor to extract appropriate data from the input waveform.

FIG. 2 is a block diagram depicting the waveform analysis subsystem 12 in greater detail and showing some of the input signals of interest. An ignition probe 13 provides the primary and secondary ignition waveforms generated by a conventional automotive ignition system including a distributor with mechanical ignition points, coil, condenser, spark plugs and interconnecting electrical conductors. A general purpose input 14 is available whereby a waveform such as the diode outputs in a vehicle alternator circuit or signals related to engine fuel injectors are introduced to the waveform analysis subsystem. A magnetic pickup input 16 is shown wherein an angular reference signal may be provided for every 360° rotation of the engine crank shaft. An expansion position 17 is provided for additional waveform inputs wherein the analysis of such waveforms may be of interest.

Figure 4:
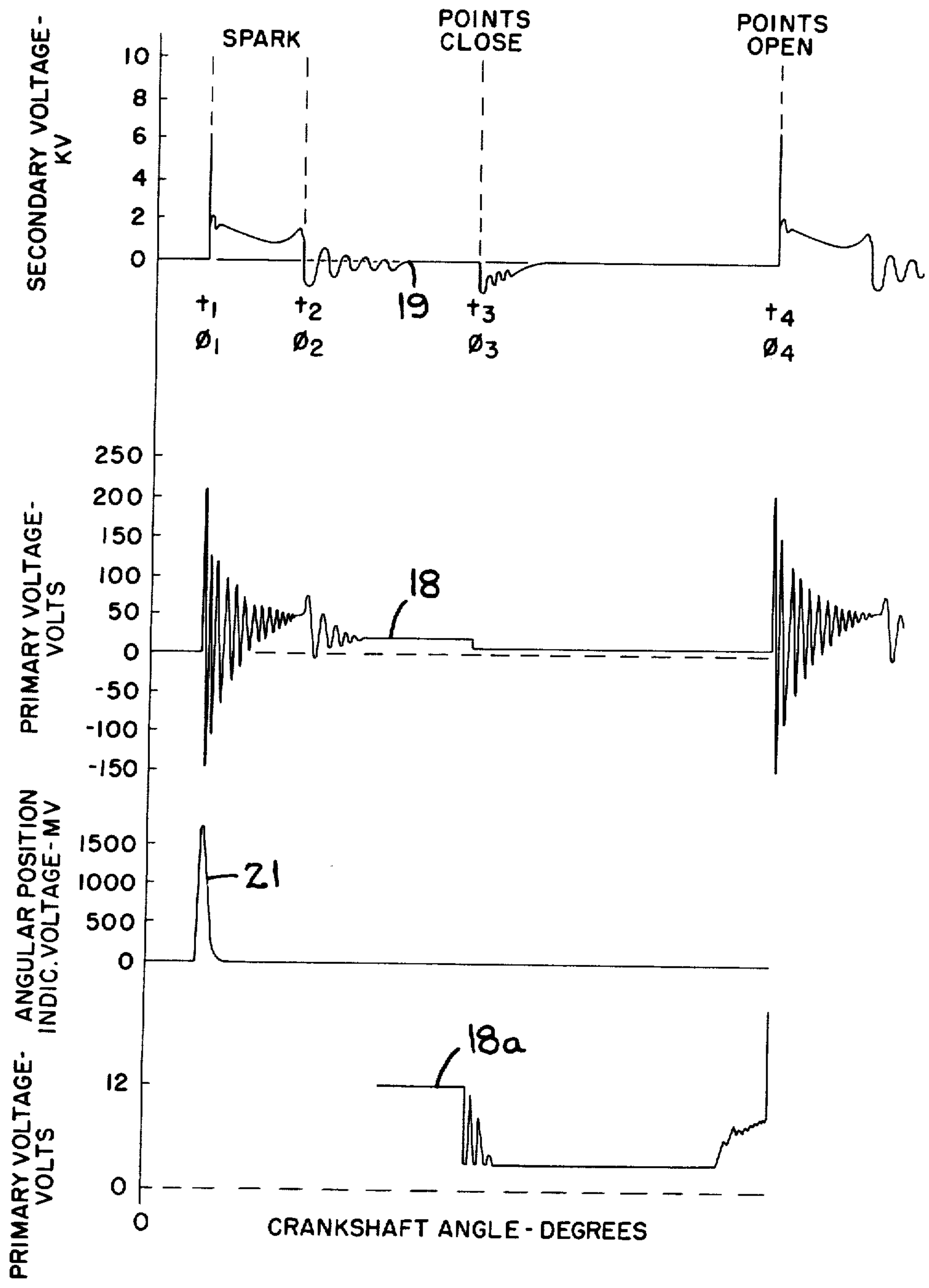
FIG. 4 is a timing diagram depicting several internal combustion engine ignition waveforms.

Reference is made to FIG. 4 of the drawings where an engine ignition primary voltage waveform 18 is shown together with an ignition secondary voltage waveform 19. Also shown on the diagram of FIG. 4 is a representative magnetic pickup signal 21. The magnetic pickup signal may or may not be in phase with one of the ignition waveforms as shown, as long as its relative phase position is known to the system.

FIG. 2 shows an electro-magnetic interference attenuation and buffer section 22 to which the engine generated waveforms are initially coupled. The signals are subsequently connected to an analog processing section 23 which is coupled through an input-output circuit 24 to a processor 26. The processor contains the usual random access and read only memory, clock and central processing unit as indicated in FIG. 2.

Referring now to FIG. 3 a block diagram is seen representing the analog processing section 23. Circuitry 27 performing an analog signal conditioning function is shown receiving the signals from the signal sources such as the signal sources 13, 14, 16 and 17 shown in FIG. 2. Such circuitry is generally attenuation circuitry for reducing the signal levels from the signal sources to some extent so that they may be accepted by the subsequent analog circuitry. The initially conditioned secondary ignition wave (waveform 19 in FIG. 4) is coupled to a secondary wave shaping circuit section 28 under the control of the processor 26 wherein the peak of the secondary wave is detected and transmitted in forms to be hereinafter described to a main multiplexer 29. The analog signal conditioning circuit also transmits directly certain of the input signals to the main multiplexer. The main multiplexer is also controlled by the processor so that predetermined ones of the inputs thereto are transmitted therethrough to a main gain control section 31. The main gain control is also subject to processor control, as will be hereinafter described, providing a properly adjusted analog signal to an analog to digital (A/D) converter 32. The A/D converter is processor controlled. The output from the A/D converter is transmitted to the processor 26 as digitized data indicative of signal magnitudes for the input signals coupled thereto through the main multiplexer 29. It may be seen from FIG. 3 that a processor controlled duty cycle control section 33 produces an output which is presented at an input to the main multiplexer. The conditioned analog input signals are also transmitted to a secondary multiplexer 34 which is controlled by the processor 26. The adjusted analog signal from the main gain control 31 is coupled to the secondary multiplexer and a number two threshold detector 36 through a switching function associated with the secondary multiplexer. The number two threshold detector receives signals from a simulation signal generator 37 so that a certain amount of hysteresis may be imposed on the threshold detector output for purposes to be hereinafter described. The output of the number two threshold detector is a binary signal having one state for input signals which exceed the reference input and another state for signals which do not exceed the reference input.

The conditioned analog signals are transmitted through the secondary multiplexer 34 together with the adjusted signal from the main gain control 31 under control of the processor 26 to a secondary gain control 38. The secondary gain control has an adjustable gain feature which is determined by the processor 26 so that the multiplexed signal is presented at the input of a number one threshold detector 39. The number one threshold detector also receives signals from the simulation signal generator 37 so that the detector output displays hysteresis in the fashion of the output from the threshold detector number two. The output of the number one threshold detector is coupled to the duty cycle control 33 which is enabled by the processor 26 to provide a duty cycle output to the main multiplexer 29. The number one threshold detector output is also a binary output similar to that of number two threshold detector. Both threshold detector outputs are coupled to the processor 26 as data.

Figure 5:
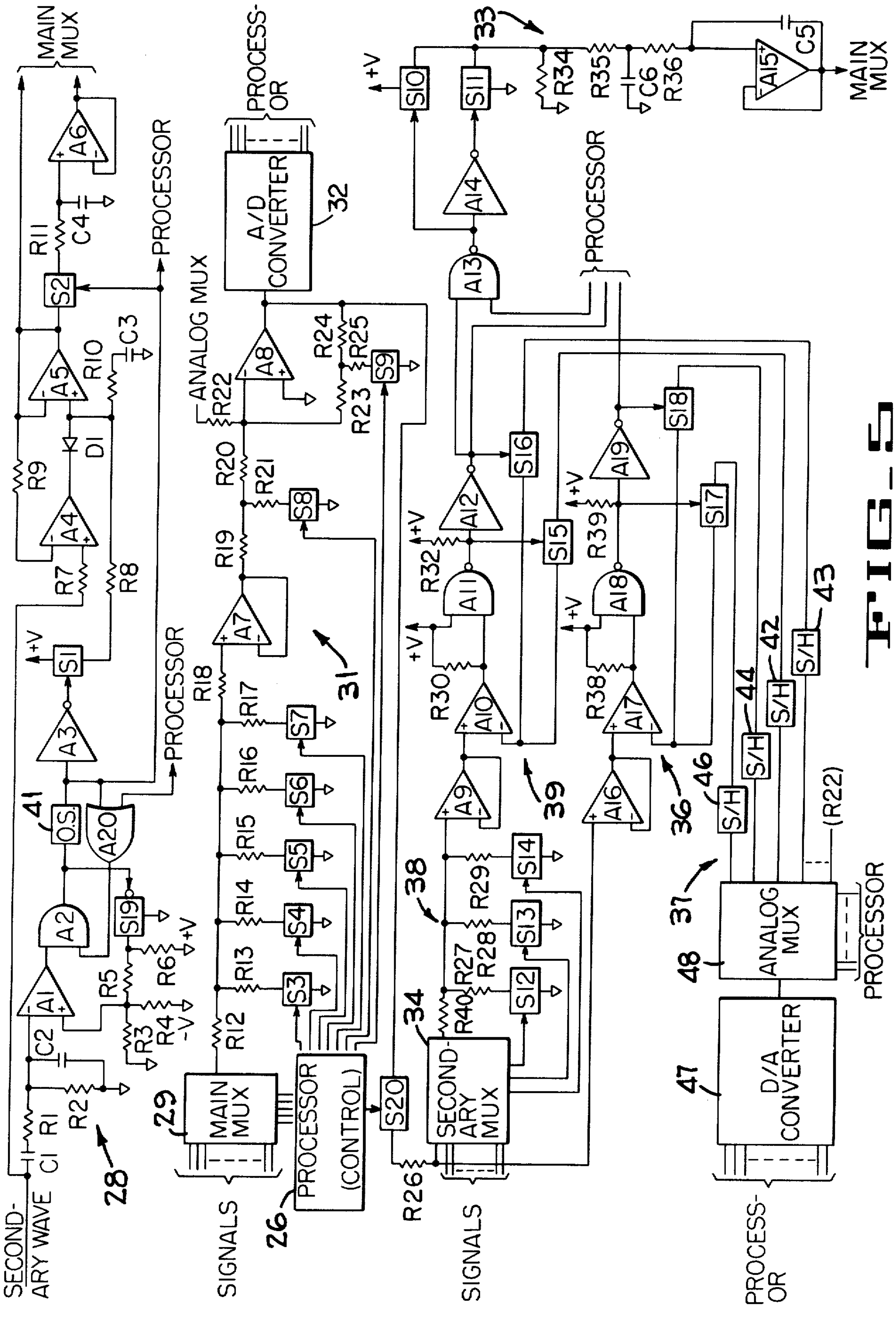
FIG. 5 is an electrical schematic diagram of the analog processing section of the present invention.

The secondary wave 19 may be seen in FIG. 4 to be a positive going wave at t1 and is presented in the drawing with such a characteristic because it is the more familiar depiction of the wave to those of skill in this field. Actually the secondary wave appears at the input to the secondary wave shaping circuit 28 as a negative going wave thereby appearing as the mirror image about the abscissa of the waveform 19 in FIG. 4. The circuit 28 as seen in FIG. 5 is constructed to accept the negative going conditioned secondary wave form and the operation of the circuit hereinafter will be described in terms of the negative going signal. It will be apparent to those of skill in this art that the wave form may be of either polarity without effecting the concepts disclosed herein for wave shaping.

With reference now to FIGS. 4 and 5 the secondary wave shaping circuit 28 is seen in the upper portion of FIG. 5 wherein the conditioned analog secondary wave (waveform 19 in FIG. 4) is coupled to the input of a differentiating circuit including capacitor C1 and resistors R1 and R2. The differentiating circuit provides a first derivative of the waveform 19 at the inverting input of a comparator A1. The comparator is set so that a reference voltage at the noninverting input thereof is determined by the resistors R3 through R5 and the level of minus V. The reference may be conveniently set at minus 0.20 volts in this example. The conditioned secondary wave has a slope steep enough to provide a first derivative in excess of the reference voltage only in the area of the firing pulse indicated at t1 in FIG. 4. The comparator output is low in the "waiting" mode in this embodiment. A switch S19 is held on by the comparator "waiting" (low) output. An output from the comparator A1 is produced (high state) when the first derivative level exceeds the reference level. The switch S19 is turned off by the high state from the comparator, removing the ground from the junction of R5 and R6 and providing a new (less negative) minus 0.05 volt reference for the comparator dye to the configuration of the resistor network R3 through R6 and the combination of −V and +V.

The comparator output also is coupled to one of the inputs of an AND gate A2. When a secondary ignition wave is selected from which data is desired, an output from the processor 26 is provided to an OR gate A20 which provides an enabling signal to another input on the AND gate A2 so that an output is provided therefrom. As a consequence the negative going secondary wave provides a continuing output from the comparator A1 until the rate of change of the secondary wave becomes less than minus 0.05 volts (approaches zero).

The conditioned secondary waves occur in series, cylinder by cylinder, at the input to the circuit 28. As mentioned hereinbefore, an output from the AND gate A2 is obtained for a preselected secondary wave by energizing the OR gate A20 with a signal from the processor 26. The OR gate output enables gate A2. The output from gate A2 is connected to a holdover one shot device 41 which provides an output pulse which is sustained during the time A2 provides an output and after the end of the pulse from the AND gate A2. The one shot output is coupled to another input at the OR gate A20 so that the AND gate A2 is enabled either by the processor or by the one shot output. The OR gate and switch S19 therefore operate to reject noise in the secondary waveform.

The output from the holdover one shot device 41 shown in FIG. 5 is also coupled to the processor 26 provide an indication of the occurrence of a firing pulse for a cylinder. The one shot signal is also coupled to the actuating terminal of an electronic switch S2 and through an inverter A3 to the actuating terminal of an electronic switch S1. The circuitry is such that in the presence of the holdover one shot pulse switch S1 is open and switch S2 is closed. In the absence of such a pulse S1 is closed and S2 is open. The preconditioned secondary wave is also coupled to the noninverting input of an amplifier A4. As mentioned hereinbefore the secondary wave is actually a mirror image (negative going) of the waveform 19 seen in FIG. 4 for the purposes of description of the circuit of FIG. 5. It may be seen that for a negative going signal coupled to the noninverting input of amplifier A4, the output from amplifier A4 will follow the input. It may also be seen that the signal on the anode side of the diode D1 on the output of amplifier A4 will also follow the negative input to the amplifier A4 as long as switch S1 is not actuated (outside the duration of the pulse from the holdover one shot device). When the pulse from the one shot device 41 is present and switch S1 is open, the point at the anode of the diode D1 and therefore at the noninverting input of amplifier A5 follows a negative going portion of the secondary wave such as the mirror image of the firing line at t1 in the secondary wave 19 (FIG. 4) until the secondary wave passes through a point of inflection ($dv/dt=0$) and becomes a positive going (through still negative) waveform. At that point the most negative level of the secondary waveform signal is held at the noninverting input of amplifier A5 and therefore appears as a "peak hold" signal at the output of amplifier A5. This is a peak firing voltage signal which may be displayed on a cathode ray tube (CRT). It is held for the holdover one shot period (beyond the end of the output from comparator A1 and AND gate A2) to allow the CRT display to respond.

The negative hold is removed from the output of amplifier A5 at the termination of the pulse from the holdover one shot device 41, switch S1 is closed allowing the input and therefore the output of A5 to once again follow the negative portion of the secondary waveform whether it be negative or positive going. Switch S2 is opened at the termination of the one shot pulse thereby leaving the negative peak voltage on the capacitor C4 which is connected to the noninverting input of amplifier A6. The output from amplifier A6 is therefore the negative peak of the secondary wave form which is held until the next output from the holdover one shot device which occurs to open switch S1 and close switch S2. Both the secondary peak at the output of amplifier A5 and the "held" secondary peak (highest DC voltage) at the output of amplifier A6 are connected to the main multiplexer 29 seen in FIG. 5. There are therefore three outputs from the secondary wave shaping circuit 28; the holdover one shot pulse coupled to the processor 26, the negative peak voltage of the secondary waveform coupled to the main multiplexer 29 and the "held" negative peak for the secondary waveform also coupled to the main multiplexer.

The main multiplexer 29 has connected thereto the input signals from the various engine characteristic sensors after those signals have been passed through the electro-magnetic interference and buffer section 22 (FIG. 2). Main multiplexer 29 may be seen to be under the control of the processor 26 so that selected ones of the buffered input signals are provided to the noninverting input of a subsequent buffer amplifier A7. A series of switches S3 through S7 may be seen to be controlled by the processor 26 whereby actuation of certain of the switches will produce a voltage division in the multiplexed signal in accordance with the ratios of the resistor R12 with any one of or combination of the resistors R13 through R17.

The output from buffer amplifier A7 is connected to an additional voltage division circuit which functions in accordance with the state to which an electronic switch S8 is controlled by the processor 26. The signal to the inverting input of variable gain amplifier A8 is therefore controlled in magnitude by the processor. The feedback loop around the variable gain amplifier A8 may be seen to include another electronic switch S9 which is also controlled by the processor. The gain of the amplifier stage A8 is decreased by closure of the switch S9 as compared to the gain when the switch S9 is controlled to an open position by the processor. There are therefore input attenuation circuits at the input of both buffer amplifier A7 and variable gain amplifier A8 together with a variable gain control switch in the feedback circuit of the variable gain amplifier A8. The output from amplifier A8 is connected to the input of the analog to digital (A/D) converter 32. The digitized analog output obtained from the magnitude channel extending from the main multiplexer 29 to the A/D converter 32 is coupled to the processor 26. The sensor signals are therefore attenuated and gain adjusted to place the signal levels within a managable range for the A/D converter.

It should be noted that the output from the variable gain amplifier is also coupled through a switch S20 to a secondary multiplexer 34 as well as to the noninverting input of an amplifier A16. The switch S20 is under the control of the processor 26 so that signals from the magnitude channel including amplifiers A7 and A8 may be transmitted to the secondary multiplexer 34.

The secondary multiplexer 34 also receives the sensed wave form signals and operates to provide a select input signal to the noninverting input of a unity gain buffer amplifier A9. An input attenuation network provides the function of the secondary gain control 38 wherein the input to the amplifier is attenuated by switching in a predetermined combination of the resistors R27 through R29 so that the multiplexed signal is attenuated (divided) in the ratio of the combination of the resistors R27 through R29 to the value of the resistors R40.

The number one threshold detector 39 includes buffer amplifier A9 which provides buffered output coupled to one input of a comparator A10. A reference voltage is connected to the other input of the comparator so that when the signal passed by the secondary multiplexer 34 (as attenuated in the gain control network 38) exceeds the reference level an output is provided by the comparator. With no output from the comparator A10 the inputs to the NAND gate A11 are both at a high state in this embodiment, thereby providing a low state at the output of the NAND gate. When the comparator A10 produces an output a high and a low state appear at the inputs to the NAND gate thereby providing a high state output which is inverted by inverter A12 and transmitted to the processor 26. The high state at the output of the NAND gate A11 causes an electronic switch S15 to conduct thereby providing the comparator reference from a sample and hold circuit 42 in the simulation signal level circuit 37 (FIGS. 2 and 5). Conversely, when there is no output from comparator A10 the output from NAND gate A11 is in a low state and switch S15 is open. The output from inverter A12 on the other hand is at a high state closing switch S16 and coupling the voltage level from sample and hold circuit 43 to the reference terminal of comparator A10. Thus, the comparator A10 exhibits a hysteresis whereby a wave form transmitted through the secondary multiplexer 34 will cause an output to occur when the waveform level exceeds the reference level coupled to the reference input on the comparator through switch S16. When the comparator output occurs the output of the NAND gate A11 assumes a high state and the output of the inverter A12 assumes a low state thereby opening S16, closing switch S15 and replacing the reference level at the reference input of the comparator A10 with a lower (more minus) level signal. Thus, fluctuation or noise in the signal coupled to the comparator A10 will not cause the comparator output to fluctuate because once the output occurs the signal level at which the output will cease is immediately reduced.

Reference to FIG. 5 shows that the output from the variable gain amplifier A8 in the magnitude channel between the main multiplexer 29 and the A/D converter 32 is connected through the switch S20 to the input of the number two threshold detector 36. The circuitry for number two threshold detector is identical to that for number one threshold detector except that the reference signal level is provided through switch S18 from a sample and hold circuit 44 when there is no output from a comparator A17. On the other hand when the signal level coupled through unity gain buffer amplifier A16 to the noninverting input of the comparator A17 exceeds the reference level from the sample and hold circuit 44, an output occurs from the comparator, a high state is produced at the output of a NAND gate A18 and a corresponding low state is produced at the output of the inverter A19. Thus, switch S17 is closed and switch S18 is opened, thereby providing a lower reference signal level to the reference input of the comparator A17 for the purposes described in conjunction with the description of the number one threshold detector 39.

The binary states at the outputs of inverters A12 and A19 for threshold detectors numbers 1 and 2 respectively are connected to the processor 26. The binary output form number one threshold detector (item 39 FIG. 5) is connected to one input of a NAND gate A13. The other input of the NAND gate is provided by a control or gating signal from the processor 26. When a selected cylinder is just about to fire an enabling pulse is provided by the processor to the NAND gate A13. The enabling signal to NAND gate A13 is provided for a predetermined cylinder just prior to the cylinder firing and is removed just prior to the next cylinder firing. In the embodiment of FIG. 5 is may be seen that a primary voltage waveform is passed through the secondary multiplexer 34 to the number one threshold detector 39 will cause an output from comparator A10 from the point Ø1 to the point Ø3 on the wave 18 when the primary waveform level exceeds the high reference value initially provided through switch S16 and subsequently the low reference value provided through switch S15 to the reference input of the comparator. When the low reference input from sample and hold circuit 42 is crossed in a negative going direction (by a judicious selection of the voltage level in the sample and hold circuit 42) the output from the comparator A10 will go low causing the NAND gate A11 output to assume a high state and the output of inverter A12 to assume a low state. This will provide a high state output from NAND gate A13 which closes an electronic switch S10 and opens electronic switch S11 to provide a positive voltage into an averaging circuit including resistors R35 and R36 and capacitor C6. Thus switches S10 and S11 are alternately switched on and off to alternately couple a ground signal and a reference level (+V) to the averaging circuit. This circuit is the duty cycle control section 33 to which reference was made in the description of FIG. 3 and is represented here (including amplifier A15 and capacitor C5) as a low pass two pole active Butterworth filter. Thus, when the primary wave 18 is in the portion of the wave from Ø3 to Ø4 (points closed to points open) the reference voltage plus V will be coupled to the circuit 33 and for the remainder of the cycle a high state at the output of inverter A14 will cause a ground reference level signal to be coupled into the circuit. As is well known to those of skill in this art when the input signal to a circuit such as that shown at 33 is alternately switched between a reference level and ground, the switching duty cycle is proportional to the average DC voltage output of the circuit. Circuit 33 will therefore provide a mean value between the ground reference and the plus V signal level with is a function of the duration of the dwell during each firing cycle. The output from the amplifier A15 will therefore have a level which corresponds to the plus V signal level in the same ratio as the angle of points dwell relates to the total angle of the distributor shaft rotation allotted to each cylinder in the engine. For example, in an 8 cylinder engine 45° of distributor shaft rotation is allotted to each of the 8 engine cylinders. Therefore if all 8 cylinders were being monitored and the output from amplifier A15 was one half of the plus V signal level, the average dwell angle for the 8 cylinders would be one half of 45° or 22½°. It may be seen that if the processor selects only one cylinder for observation through the averaging circuit (duty cycle control 33) seen in FIG. 5, the output from the amplifier A15 would have to be multiplied by 8 in this example to obtain a representative signal level for an 8 cylinder engine for comparison to the plus V signal level to obtain the dwell for that particular cylinder. The output from the duty cycle circuit 33 is connected to the main multiplexer 29.

Various analog signal levels are required for use in the analog circuitry. These signal levels are generated by commands from the processor 26 which is connected to a digital to analog (D/A) converter 47 which is contained in the simulation signal level circuit section 37. The digital signal converted to analog form is coupled to an analog multiplexer 48 where it is selectively transmitted, to any one of the sample and hold circuits 42, 43, 44 or 46 or to any other required point in the analog circuitry such as that designated (R22). The sample and hold circuits are in turn coupled to threshold detectors 1 and 2 seen in FIG. 5 as items 39 and 36 respectively. The signal terminal designated (R22) is coupled through resistor R22 to the inverting input of the variable gain amplifier A8 in FIG. 5. This signal serves as a DC offset voltage for the variable gain amplifier which changes the reference for the signal at the inverting input to the amplifier by shifting the DC level of the amplifier input. This is a further operation in processing the signals through the magnitude channel so that the inputs to the A/D converter 32 are optimized. The A/D data signals are arranged to be processed so that they fall within a small range which is compatible to the A/D converter, for example zero to five volts.

In summary, the circuit of FIG. 5 provides a "held" peak kilovolt indicative signal for the secondary wave from the output of amplifier A6 to the main multiplexer 29. An extended peak kilovolt indicative signal for the secondary wave is also provided for the duration of the pulse from the one shot device 41 which is also connected to the main multiplexer. Digitized sensor signals are selected by the main multiplexer and processed in an analog domain prior to being digitized in the A/D converter so that the measurements may be recognized by the processor 26. Binary outputs are provided from numbers one and two threshold detectors to the processor also. The processor on the other hand controls the analog circuitry by selectively gating the secondary wave forms through the secondary wave shaping circuit 28, by controlling the attenuation, gain and offset of the signals in the magnitude channel between the main multiplexer and the A/D converter, by controlling the attenuation of the signals multiplexed to the number one threshold detector, by gating the appropriate primary wave segments to the averaging circuit, and by controlling the simulated analog signal level multiplexer 48 to provide predetermined sample and hold signals and a DC offset signal.

With reference now to the remaining Figures in the drawings, explanations will be undertaken to explain the data acquisition and diagnostic steps for distributor point dwell, points arcing and points resistance, as well as the acquisition of secondary waveform peak kilovolt data and the diagnostic and repair instruction uses to which the peak kilovolt data is put.

Figure 6:
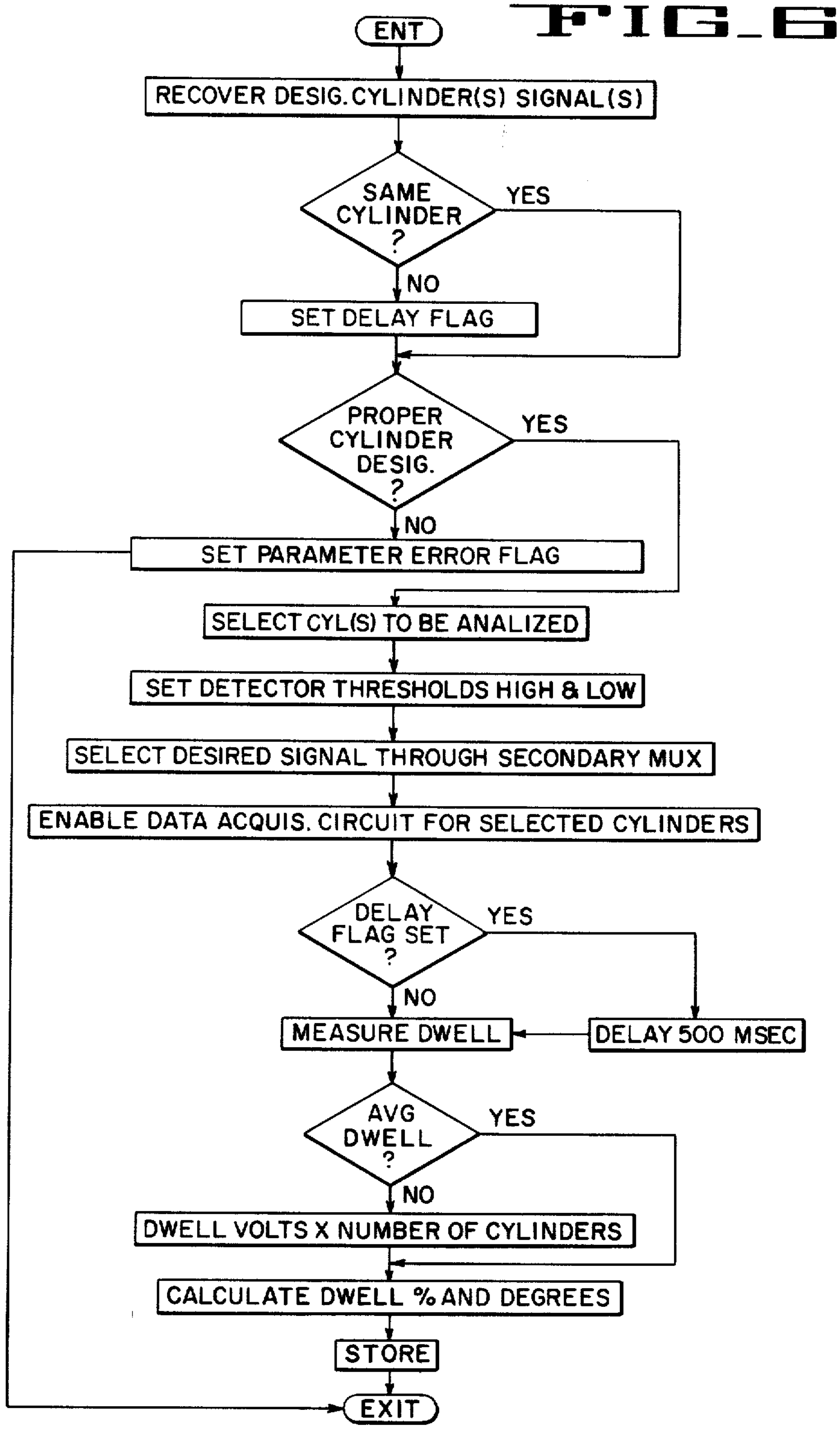
FIG. 6 is a flow diagram for engine dwell data acquisition.

With reference now to FIG. 6 of the drawings a flow chart is seen which describes distributor points dwell data acquisition. The data acquisition routine is entered and the processor looks at the input instructions to determine which cylinder signals to recover for the desired data acquisition. Consequently, when the program scan continuously being undertaken looks at the cylinder for which data recovery is required, the system inquires as to whether this is the same cylinder for which data was recovered in the previous scan. When the cylinder is the same one which was observed in the immediately preceding scan, the processor subsequently asks if this is a proper cylinder designation. For example, the engine may be only a four cylinder and data recovery may be requested for cylinder number 6. In such a case the answer to the proper cylinder designation query will be "no". If the cylinder is properly designated the answer to the foregoing query will be "yes" and the processor will proceed to select the number of the cylinder or cylinders which are to be analyzed. Thus far the type of data which is to be collected has been decided and the cylinder numbers for which the data is to be collected has also been decided. It may be seen by further reference to FIG. 6 that if this is the first scan for the particular cylinder for which data is being acquired then the answer to the same cylinder inquiry is "no" and a delay flag will be set in the processor. The processor proceeds to ask the question relative to whether this is a proper cylinder designation for the engine under test. If the last mentioned question is answered "no" then a parameter error flag in the processor is set and the routine is exited.

The data to be recovered and the selected cylinder or cylinders being designated, the detector thresholds are next set for both high and low levels. The desired sensed signal is selected to be transmitted to the secondary multiplexer 34 and the enabling signal from the processor 26 for selected cylinders is coupled to the enabling input of the AND gate A13 (FIG. 5). The enabling signal is provided by the processor for select cylinders or all cylinders according to the test data sought by an operator of the system. At this point the processor looks to see if the aforementioned delay flag has been set in the event this is a new cylinder for this scan. If the answer is "yes" the computer will be delayed in its data taking for a period of 500 milliseconds so that transients and instability in the sensor waveforms may settle out. The delay of 500 milliseconds merely requires the processor to make no commands or decisions for 500 milliseconds so that the threshold circuits may be set up by the computer. Also the output of the averaging circuit must be allowed to go back to zero output as the charge on capacitor C6 from the measurement of the previous cylinder dwell dissipates through resistors R35 and R34 to ground before the next cylinder dwell measurement is undertaken. Thereafter the dwell is measured as described in the discussion of the duty cycle control circuit 33 containing the averaging circuit and the amplifier A15. The processor then inquires as to whether the data required is the average dwell (the average dwell for each cylinder in the engine divided by the number of engine cylinders) and if the answer is "yes" then the processor may proceed directly to a calculation of the dwell percentage and the number of degrees of dwell. On the other hand, as explained hereinbefore, if the dwell is desired for a specific cylinder, then the averaging circuit output must be multiplied by the number of cylinders in the engine prior to calculation of dwell percentage and degrees. The calculated dwell data is stored in memory and the routine is exited.

Figure 7:
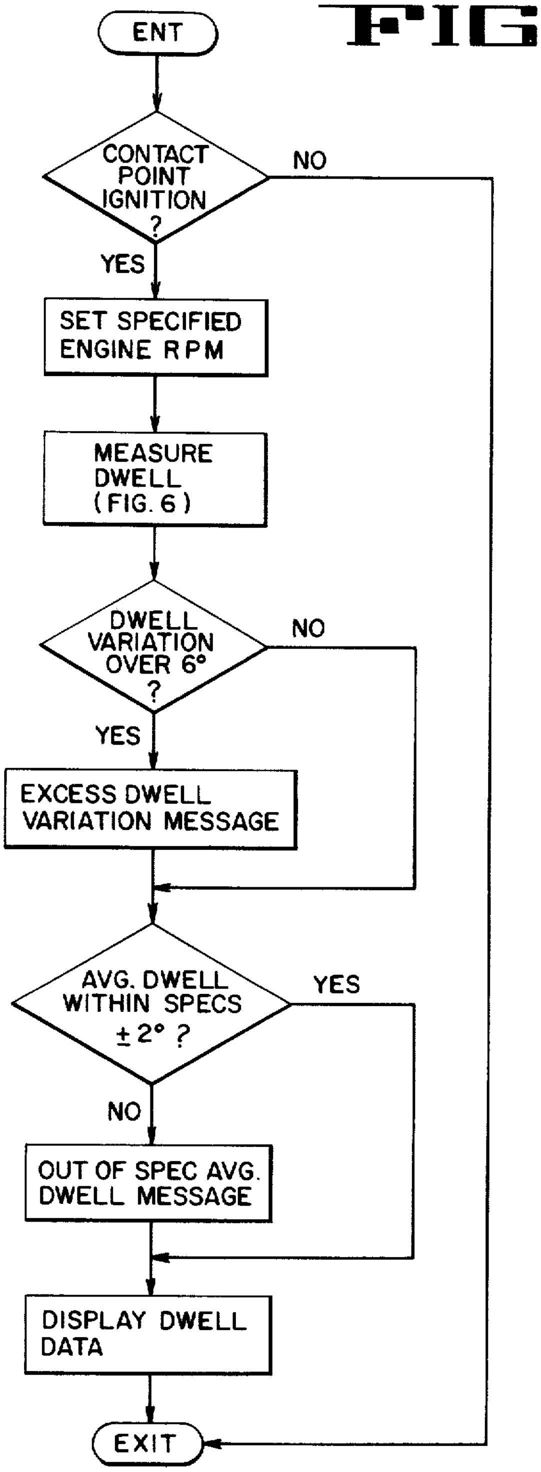
FIG. 7 is a flow diagram for engine dwell diagnosis.

With reference now to FIG. 7 a flow chart depicting the diagnostic steps and the steps toward informing the ignition wave analyzer operator of the necessary repair procedures is shown. The routine is entered and the processor 26 looks to see if the ignition system includes mechanical contact points. If the system does not include such points this diagnostic routine is exited as meaningless. On the other hand if the system does include such points the processor measures the engine rpm and provides a visual instruction to the operator to set a predetermined engine rpm. After that rpm is set by the operator within predetermined tolerance limits, the processor enters into the dwell measurement routine of FIG. 6 described hereinbefore. Upon completion of the dwell measurement the processor observes the test results and determines if the dwell variation from cylinders to cylinder is over 6°. If it is not in excess of 6° then the routine continues and the processor further observes if the average dwell for all of the cylinders being tested is within some predetermined specification such as plus and minus 2°. If the average dwell is within the specifications then the dwell data is displayed and the routine is exited as normal functions have been observed in the engine dwell characteristics. On the other hand if the dwell variation from cylinder to cylinder happens to be over 6° then an excess dwell variation message is displayed to the operator in a form as follows:

Dwell variation is 8° (for example).
Variation should be less than 6°.
Check distributor shaft and bushings.
Check distributor breaker cam or plate.
Repair as necessary.
Press continue.

After the indicated operator undertakings have been performed and the "continue" selection has been pressed, the average dwell tolerance of plus and minus 2°, for example, is inspected. If the average dwell tolerance is exceeded then an out of specification average dwell message is displayed to the operator as follows:

Dwell should be between 20.5° and 24.5° (for example).
Adjust distributor point cam as necessary.
Press continue.

The out of spec average dwell message also includes an engine rpm bar graph together with a dwell angle bar graph.

Figure 8:
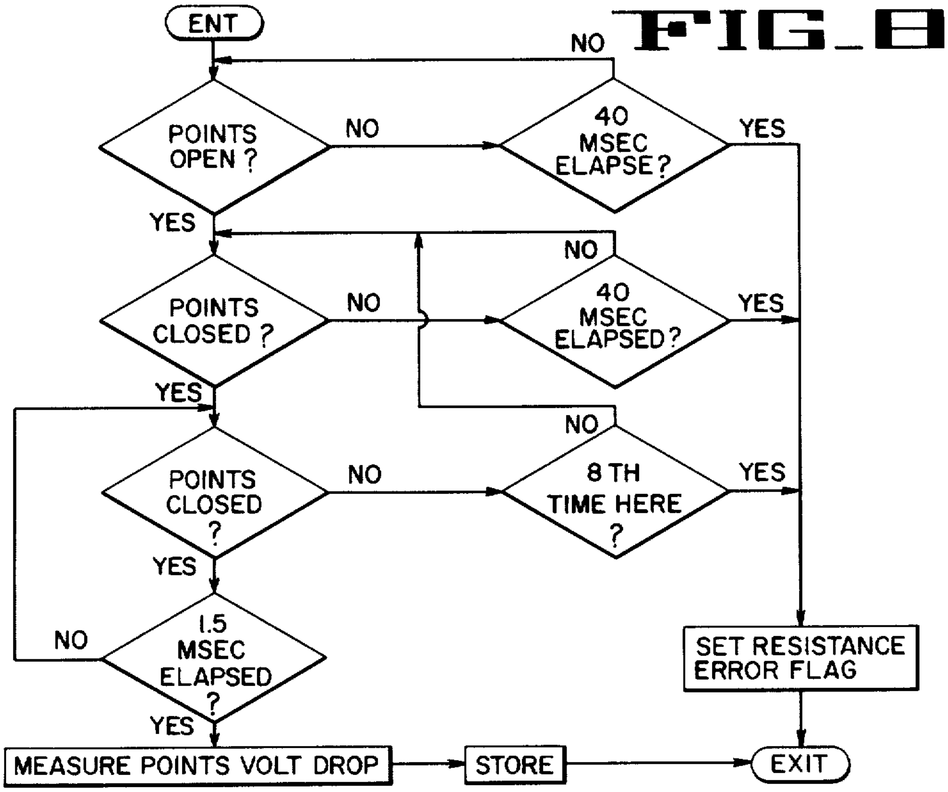
FIG. 8 is a flow diagram for points resistance data acquisition.

Referring now to the flow diagram of FIG. 8 the manner in which the apparatus described herein is controlled to thereby operate to provide data acquisition for the resistance of the mechanical distributor points is shown. The data acquisition begins when the processor observes the current status of the primary wave form 18 (FIG. 4) in this example at the binary output of number one threshold detector 39, (FIG. 5) to ascertain if the points are open or closed. Either the primary or the secondary waveform may be utilized depending on the configuration of the circuitry. If the points appear to the processor to be closed then the processor observes whether 40 milliseconds have elapsed since the condition of the points was first observed. If such time period has not elapsed then the condition of the points is looked at again, if the points appear to be closed for more than the 40 millisecond time period, then the processor decides that the engine is not functioning in a mode such that the points resistance measurement may be made (the engine may be stopped) and a resistance error flag is set before the routine is exited. When the points are opened, then the processor looks to find the next point of closure. The points must close within 40 milliseconds elapsed time or the resistance error flag is set as mentioned hereinbefore. Thus, when the points are closed they must open within 40 milliseconds and conversely when the points are open they must close within 40 milliseconds or the system will provide an indication that the measurement, if any, is not to be used. When the processor determines that the points are closed it "looks" again at the output from the number one threshold detector, continuously sampling the output to assure that the points remain closed for 1.5 milliseconds. If the points are noisy and there are voltage oscillations in the points closed section of the primary, or if that portion of the primary wave between Ø1 and Ø3 is being sampled, the second "look" to determine if the points are closed may indicate a points open condition due to the oscillations. The processor then repeats the "points closed" test sequence up to an arbitrary number of times (8 in this example) or until the points remain closed for 1.5 milliseconds. If the routine goes through the points closed-points open sequence more than the arbitrary number of times, the resistance error flag is set and the routine is exited. Thus, a noisy points signal or oscillations in the primary wave will not cause the routine to continue to cycle in this portion of the testing for more than the arbitrary number (8) of points closed investigations before providing an indicator that the points resistance test will probably produce erroneous data.

On the other hand, if the points closed observation by the processor 26 shows the points to be closed on the second interrogation, then the processor requires that 1.5 milliseconds elapse before the voltage drop across the points is measured and stored. This puts the measurement at a point on the waveform 18 which is displaced from position Ø3 between Ø3 and Ø4. The routine is thereafter exited.

Figure 9:
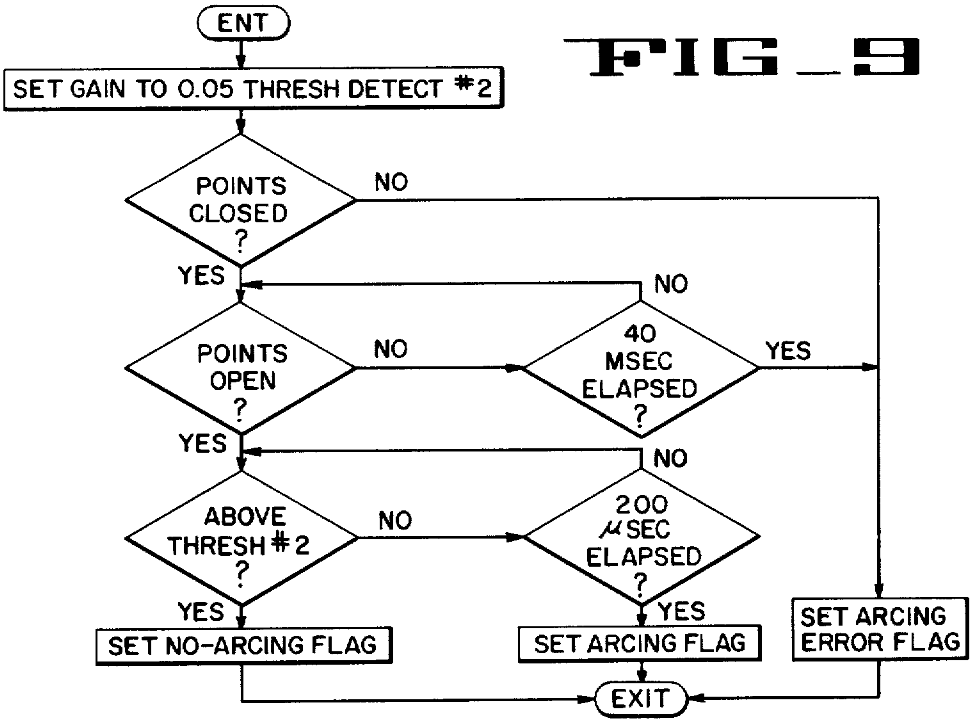
FIG. 9 is a flow diagram for points arcing data acquisition.
Figure 10A:
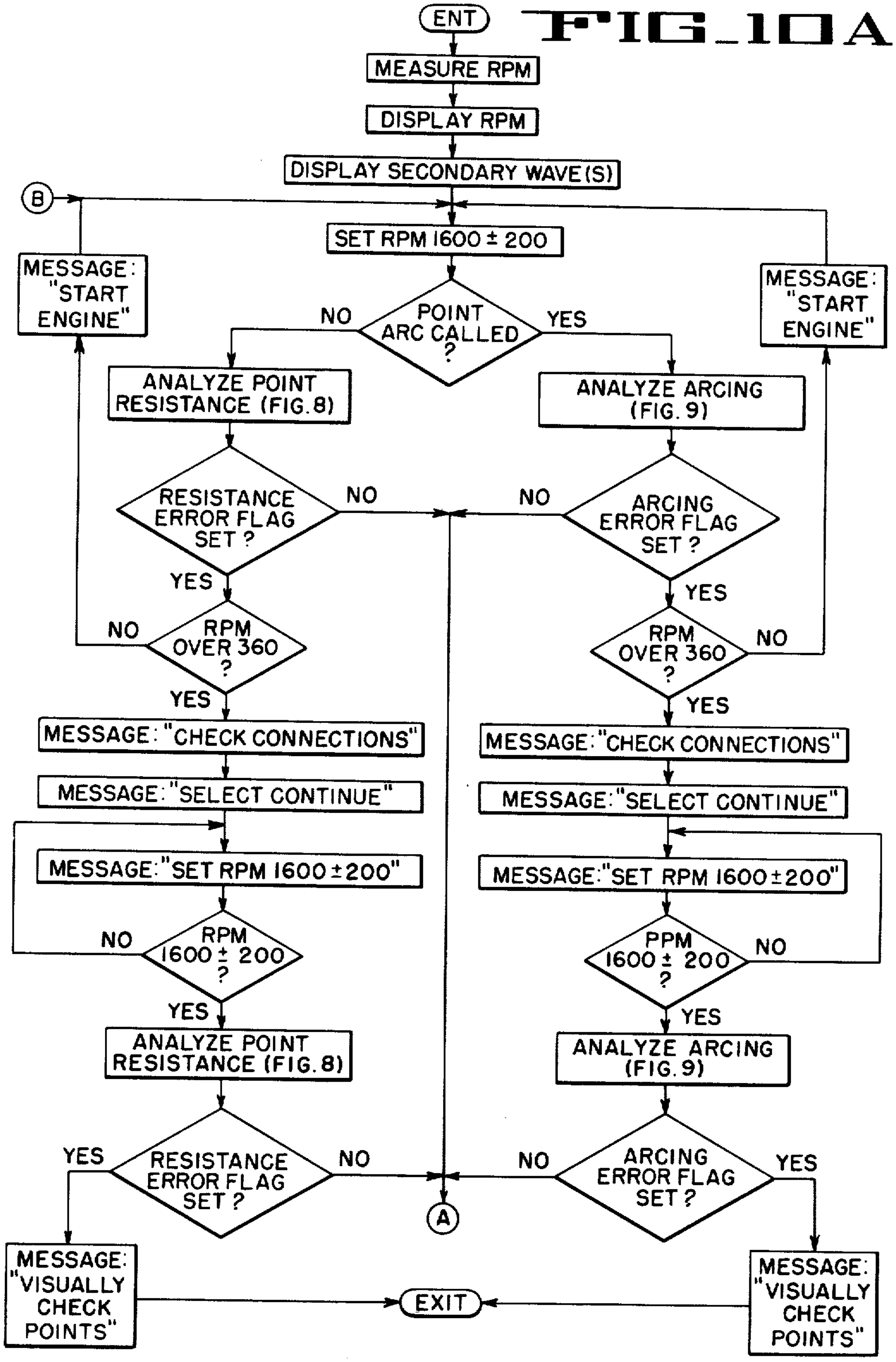
FIGS. 10A and 10B are flow diagrams for points arcing and points resistance diagnosis.
Figure 10B:
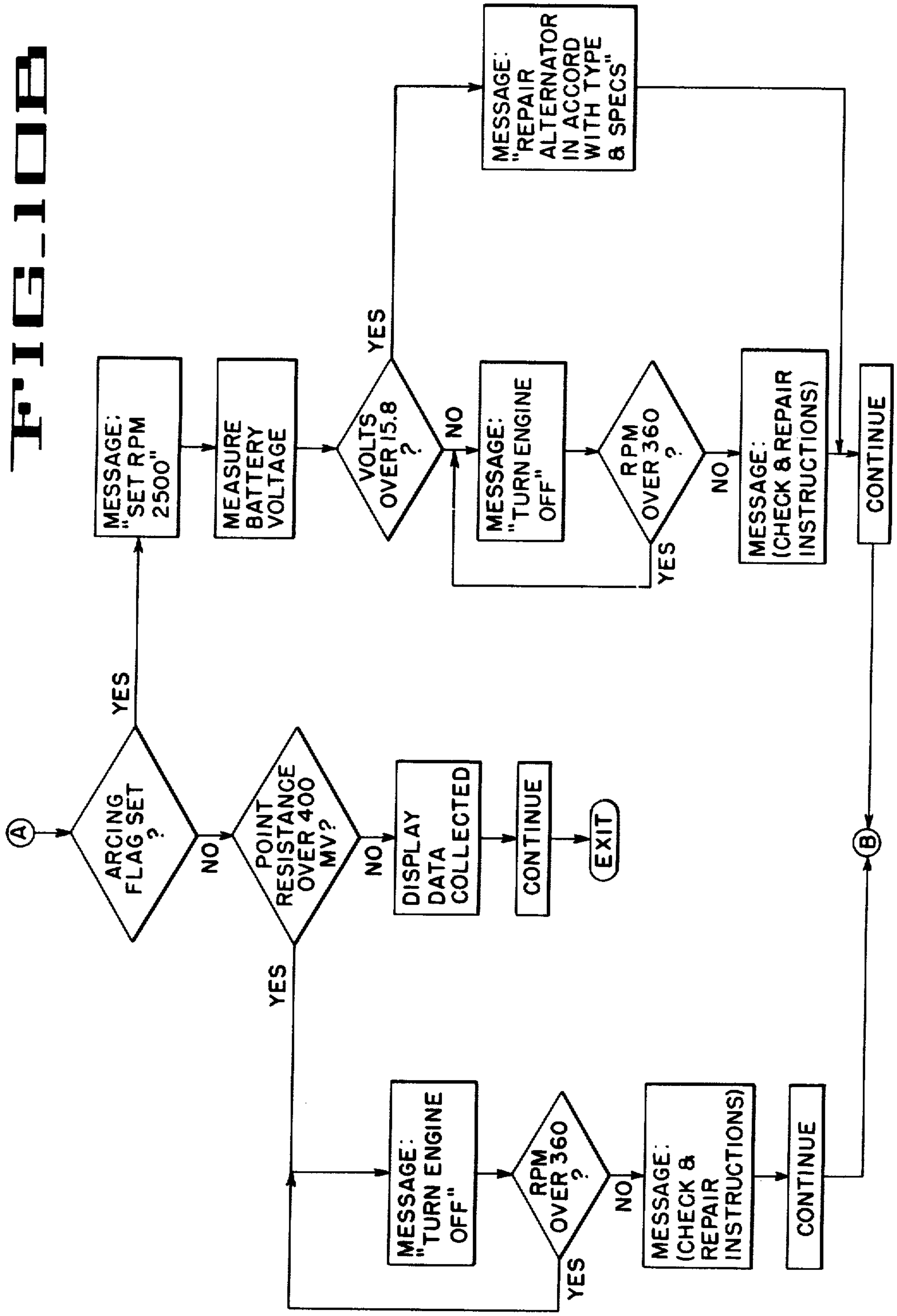

It is advantageous to describe the flow chart of FIG. 9 wherein points arcing data is obtained before proceeding to FIGS. 10A and 10B wherein the points arcing and points resistance data are utilized in diagnosing the points condition and instructing the analyzer operator in the necessary repairs, if any. FIG. 9 is entered out of the routine of FIG. 8 with the points still closed. The processor sets the gain of the variable gain amplifier A8 (FIG. 5) at a relatively low value, for example 0.05. The purpose is to set the signal level of the primary wave 18 which is passed to the number two threshold detector to a level low enough to be handled by the threshold detector components. The sample and hold circuits 44 and 46 are set by the processor as described hereinbefore to provide reference levels for the number two threshold detector 36 which are both relatively high; i.e. in the range of 15 to 40 volts. The number one threshold detector is provided with reference levels of 3 and 2 volts through electronic switches S15 and S16 respectively in a fashion hereinbefore described. The processor determines if the points are still closed. If they are not, then an "arcing error" flag is set by the processor which indicates the points have opened too soon and any data may be unreliable. When a points closed detection is made by the processor the routine is scanned until the next points opening occurs. This is detected by number one threshold detector as the primary wave 18 increases through the 3 volt reference level in the region of Ø4 (FIG. 4). If the points do not open in 40 milliseconds elapsed time the arcing error flag is set as the circumstances are not proper for the test data to be obtained (the engine may be stopped). When the points open, the output from number two threshold detector is observed to see if the points voltage has risen above the threshold in the 15 to 40 volt range. If the waveform level does not rise above the number two threshold detector reference in less than 200 microseconds elapsed time after the opening indication from number one threshold detector then an "arcing" flag is set by the processor. The condition observed by the processor in this instance is that shown by the vertically expanded primary wave form **18*a* (FIG. 4) just preceding the Ø4 position. On the other hand, if the primary waveform does rise above the number two threshold reference in less than the 200 microseconds elapsed time, a "no arcing" flag is set by the processor. Subsequent to the setting of the "no arcing", "arcing" or "arcing error" flags the routine of FIG. 9** is exited.

FIGS. 10A and 10B show flow diagrams which depict the manner in which the indications obtained through the data acquisition processes of FIGS. 8 and 9 described hereinbefore are utilized by the processor to perform the logic for the operator and to draw conclusions for him. Initially, as may be seen in FIG. 10A, the engine rpm is measured and displayed together with the selected ignition waveform to which the attention of the processor 26 is drawn or a stacked array of ignition waveforms for each of the cylinders of the engine. The waveform to which FIG. 10A makes reference is the secondary, although the circuitry may be configured to accept either the primary or secondary as stated hereinbefore. A message is diplayed which requests the operator to set the rpm at 1600±200 rpm. An inquiry is made as to whether a points arcing test is called. The alternative to the points arcing test in this routine is the points resistance test. Presuming for the moment that the points arcing test has been called, the process shown in FIG. 9 is implemented so that the arcing measurements may be taken. In the event the arcing error flag has not been set the routine proceeds to a point A wherein the subsequent flow diagram will be described in conjunction with FIG. 10B. If the arcing error flag has been set the processor observes whether the engine rpm exceeds 360. If it does not then the processor presumes that the engine has not been started and displays a "start engine" message to the operator. Once the engine has been started the display repeats the "set the rpm at 1600±200 rpm" to the operator and, in this instance, the point arc test having been called, the analysis in accordance with the flow diagram of FIG. 9 is repeated. If the "arcing error" flag is still set and the rpm is over 360, a message is displayed to the operator stating "check connections". This refers to the ignition system connections and the test lead connections. A subsequent message "select continue" is displayed to the operator so that when the operator is prepared to continue the test after the check of the connections he may do so by pressing a "continue" key. Thereupon a message is displayed to the operator telling him to "set engine rpm at 1600±200 rpm". The processor observes whether or not this instruction has been carried out and repeats the message until the processor senses that the engine rpm has been set to the predetermined engine speed range. Once the operator complies with that instruction, the process depicted in FIG. 9 is again carried out and the processor determines if the "arcing error" flag is still set. In the event it is still set a message is displayed to the operator requiring "visually check points". Thereupon the routine is exited. If, however, the "arcing error" flag is no longer set, then the routine proceeds to point A which may be seen in FIG. 10B. The processor next determines whether or not the "arcing" flag has been set and if the answer is "yes" then the instruction is displayed to the operator to "set rpm 2500". The processor then measures the battery voltage and determines if the voltage is over 15.8 volts (in this example). If the determination is that the voltage does exceed 15.8 volts then a message is displayed to the operator to "repair alternator in accordance with alternator type and specifications". The procedure thereafter requires the operator to depress a "continue" key, whereupon the routine re-enters the flow diagram of FIG. 10A as indicated at point B. In the event the battery voltage is less than the exemplary 15.8 volt level, a message is displayed to the operator to "turn the engine off". The engine shut down is monitored by the processor until the engine rpm decreases below 360 rpm and the following message with check and repair instructions is displayed to the operator:

Contact points are arcing.
Check points and condensor.
Replace as necessary.
Press "continue".

Returning now to FIG. 10A in the event the processor determines that the point arcing test has not been called, then the alternative test in this instance "analyze resistance" has been called. The resistance analysis is performed in accordance with the flow diagram of FIG. 8 and the processor notices whether or not the resistance error flag has been set. In the event no error flag has been set, the processor continues to point A in FIG. 10B. However, if the error flag has been set, the processor next determines if the engine rpm exceeds 360. In the event it does not the processor presumes the engine is at a standstill and displays a message to the operator to "start engine". Upon starting the engine the message is displayed to the operator to "set engine rpm to 1600±200 rpm". The points resistance test having been called, the process of FIG. 8 is repeated and another determination is made by the processor as to whether or not the resistance error flag is set. If the flag is still set and if the engine rpm is over 360, therefore indicating the engine is running, a message is displayed to the operator to "check connections" referring to the test set connections as well as the ignition system connections. Subsequently, (after the connection check) the message "select continue" is displayed to the operator. Upon selection of "continue" a message "set rpm 1600±200 rpm" is displayed to the operator and the performance of this test is monitored by the processor. When the aforementioned engine speed range is reached, the tests outlined by the flow diagram of FIG. 8 are again performed and the processor determines if the resistance error flag is still set. If the flag is still set, a message is displayed to the operator to "visually check points". Thereafter the routine is exited. In the event there is no resistance error flag set at this point in the test, the routine of FIG. 10B is entered and when the processor determines that no "arcing flag" is set a determination is next made as to whether or not the points resistance (which has been measured by the process diagrammed in FIG. 8) exceeds 400 millivolts (for example). In the event this specification level is not exceeded, the collected data is displayed for the operator and upon selection of "continue" the routine is exited. A message similar to the following will be displayed to the operator:

Contact point dwell is 22.5°.
Dwell variation is 1.5°.
Point resistance is 325 millivolts.
Press "continue".

In the event the point resistance does exceed the specified 400 millivolts, the operator is instructed to turn the engine off. The shut down of the engine is monitored by the processor until such time that the engine rpm falls below 360. Thereupon the following message is displayed for the operator:

Volts are 500 millivolts (for example).
High contact points resistance.
Check
1. Contact points.
2. All connections.
3. Distributor primary wire.
4. Distributor ground.
Repair as necessary.
Press "continue".

Upon selecting the "continue" function the processor returns the routine to the point B shown in FIG. 10A wherein additional scans such as those described hereinbefore are undertaken.

Figure 11:
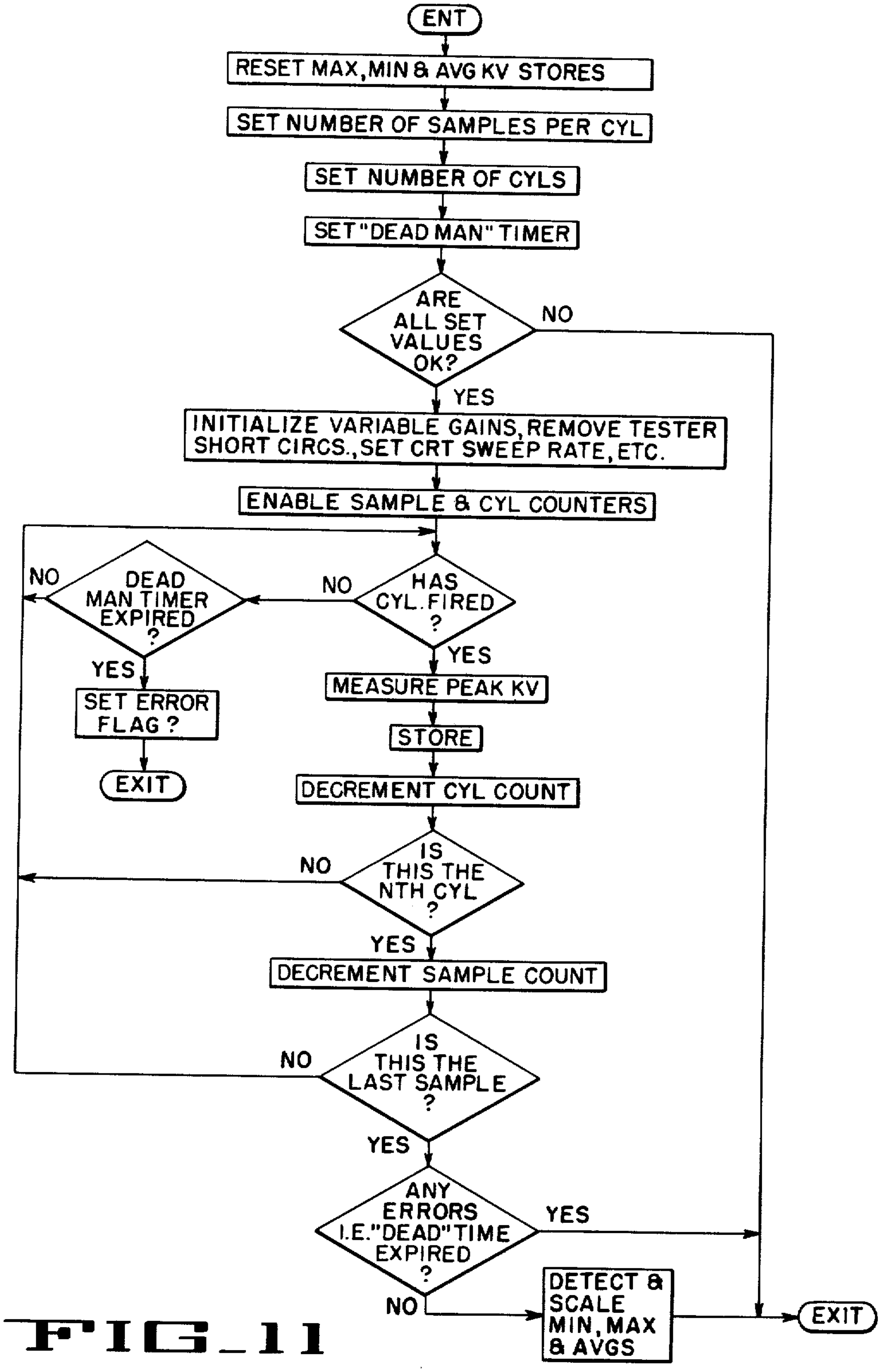
FIG. 11 is a flow diagram for ignition wave form peak kilovolt data acquisition.

With reference now to the flow diagram of FIG. 11 the manner in which the secondary ignition waveform peak kilovolt data acquisition is undertaken will now be described. The processor resets assigned memory locations for maximum, minimum and average kilovolt readings to be stored. The processor then "looks" at how many samples of the peak kilovolt reading per cylinder it has been instructed to take. Further, the number of cylinders in the engine is observed by the processor. A "dead man" timer is set by the processor which simply sets a predetermined period of time within which a chlinder firing event must be evidenced by a monitored ignition waveform. If all of the set values are reasonable in the context of the system operation (i.e., the number of cylinders is indicated as six for the engine under test is actually a four cylinder engine rather than an eight cylinder engine) then the processor operates to set appropriate gain in the magnitude channel of FIG. 5 extending between the main multiplexer 29 and the A/D converter 32. If the processor determines that one or more of the entered values is not consistent with the identified engine under test, then the routine is promptly exited. Sample counters for the number of samples for each cylinder and the cylinder counters for the number of cylinders being tested are enabled and the processor immediately determines if a cylinder has fired. The determination as to whether or not the cylinder has fired is made by the processor upon observing the output from the one shot device 41 in the circuit 28 of FIG. 5. If the cylinder has not fired, the processor determines if the present "dead man" timer has expired. If it has, an error flag is set for this operation and the routine is exited. On the other hand, if the "dead man" timer has not expired, the processor again "looks" to see if the one shot device has provided a cylinder fire indication pulse. When the firing pulse indicator is detected, the held peak kilovolt value for the secondary wave is measured as it is received from the output of the amplifier A6 in the secondary wave shaping circuit 28. It should be noted that the processor stores several quantities which relate to the peak kilovolt firing voltage for each cylinder. The minimum firing voltage level for each cylinder is stored together with the maximum peak kilovolt firing voltage for each cylinder. The minimum and maximum values are obtained from a predetermined number (sample number) of such peak kilovolt readings for each cylinder. An average peak kilovolt reading from the samples for each cylinder is obtained and stored. The absolute minimum peak kilovolt voltage from all values from all cylinders observed over the number of samples required from each cylinder is stored. In like fashion an absolute maximum peak kilovolt value is stored. Lastly, the average peak kilovolt values for each of the engine cylinders are averaged to provide an average peak kilovolt reading for the engine, which reading is also stored.

Once the measured peak kilovolt reading for a particular cylinder is obtained and stored, the counter which records the number of cylinders in the engine is decremented by 1. The processor then determines whether or not this is the last cylinder to be observed in the engine, and if the determination is that this is not the last cylinder then the processor provides another enabling pulse to NAND gate 13 (FIG. 5). The processor thus determines that the next cylinder to fire is to be observed. When the last cylinder has been observed in the firing sequence of cylinders, the counter which has recorded the predetermined number of samples for each cylinder is decremented by 1. The processor then determines whether or not this is the last sample which is called for and if it is not, the processor observes whether or not the next cylinder for which data is to be taken has fired. When the last sample for the last cylinder has been taken, the processor "looks" for any error signal which may exist, such as (for example) whether or not the "dead man" timer has expired during the data taking. In the event such errors do exist the process is exited. If no such errors exist then the minimum, maximum and average readings to which reference has been made hereinbefore are scaled to provide intelligible data and the routine is exited.

Turning now to FIG. 12, the manner in which the acquired data relating to secondary waveform peak kilovolt firing voltage data is utilized to diagnose engine ills and provide operator instructions for maintenance and repair will be undertaken. The routine is entered with a measurement of the engine RPM by the processor and a determination by the processor as to whether or not the engine is at a speed of 1600 plus minus 200 RPM. When that speed range has been attained the peak kilovolt data acquisition routine of FIG. 11 is performed. An arbitrary high voltage fail parameter (i.e., 20 kv for high energy systems) is set in the system and referenced by the processor 26. The average peak kilovolt readings from each successive cylinder are added to the previously measured peak kilovolt readings to obtain a total reading. The processor determines if this is the last cylinder to be monitored so that when all of the averaged readings from all of the cylinder are added together the highest average peak reading may be thrown out from the total. Then the lowest peak reading is thrown out from the total. The remainder with only the highest peak thrown out and the remainder with both the highest and lowest peaks thrown out are both stored in separate locations in memory. The stored remainder with only the highest peak thrown out is averaged over the remaining cylinders to produce a high quotient. In like fashion the stored remainder with both highest and lowest peak values thrown out is averaged over the remaining cylinders to thereby provide a low quotient. A sliding high parameter is set which is in this embodiment 1.5 times the high quotient. A sliding low parameter is set which in this embodiment is 0.67 times the low quotient. Thus, an absolute high voltage fail levels has been determined to which the processor may make reference, and abnormally high and low reference parameters are determined for the peak kilovolt average readings which are dictated by the actual readings obtained through the testing as outlined in the flow diagram of FIG. 11. It may thus be seen that measured engine data as well as engine specifications are used to diagnose the engine performance and generate instruction signals.

Figure 12A:
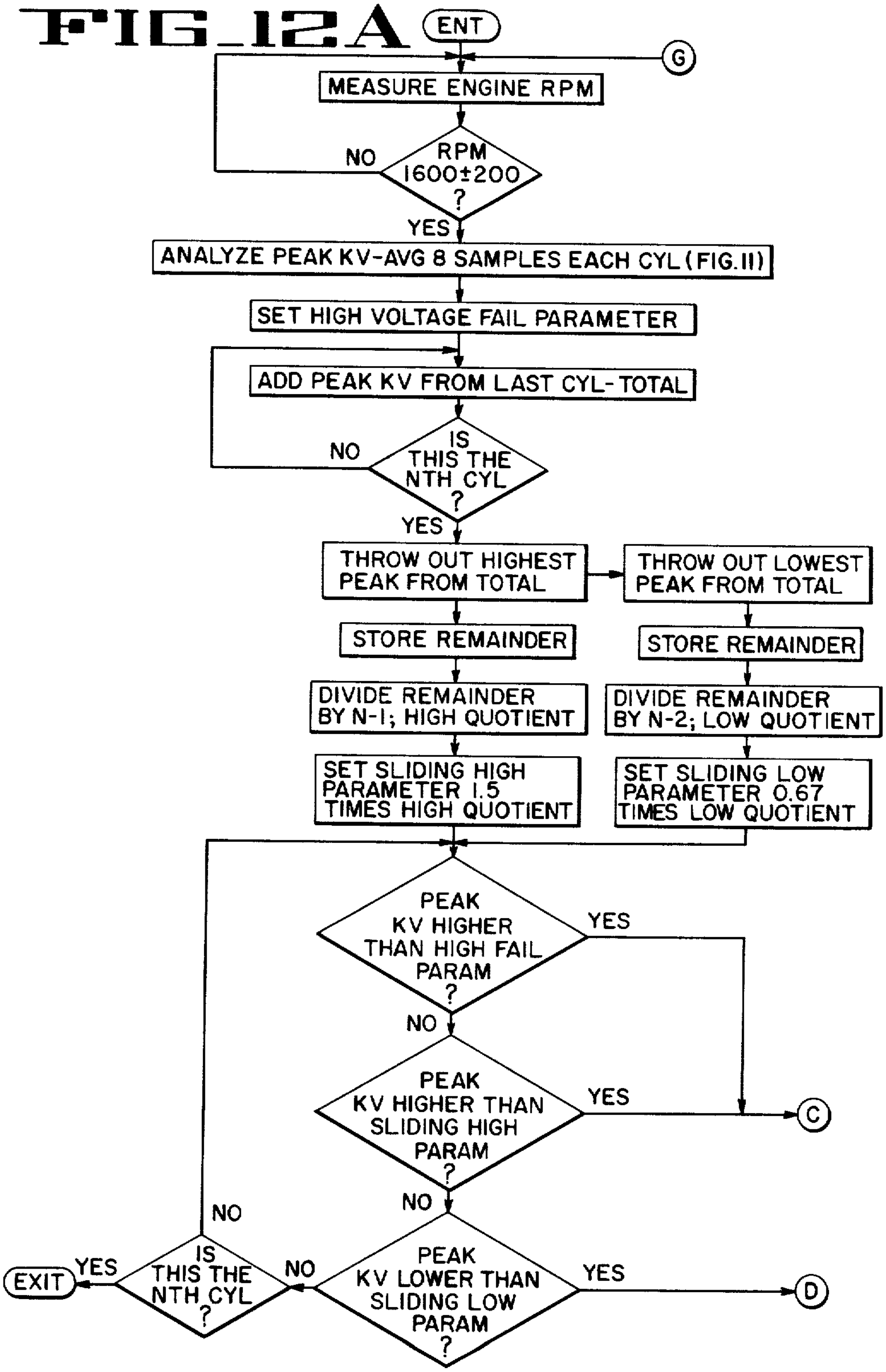
FIGS. 12A through 12E are flow diagrams for engine ignition wave form peak kilovolt diagnosis.

The processor 26 thereafter determines whether or not the peak kilovolt measurement is higher than the arbitrarily high fail parameter. In the event it is, the routine proceeds to point C on FIG. 12B. If the peak kilovolt reading is lower than the arbitrarily high fail parameter then the processor determines if the peak kilovolt reading is higher than the sliding high parameter (1.5 times the high quotient). In like fashion, if that sliding high reference level is exceeded the routine proceeds to point C in FIG. 12B. If neither the high nor the sliding high parameter levels are exceeded by the peak kilovolt measurement then the processor determines if the peak kilovolt reading is lower than the sliding lower parameter. If the measured average peak kilovolt value is higher, then the sliding lower parameter than the next cylinder is observed by the processor until all cylinders are observed and the routine is exited as seen in FIG. 12A. If the peak kilovolt level is in fact lower than the sliding low parameter, then the routine proceeds to D as seen in FIG. 12E.

Figure 12B:
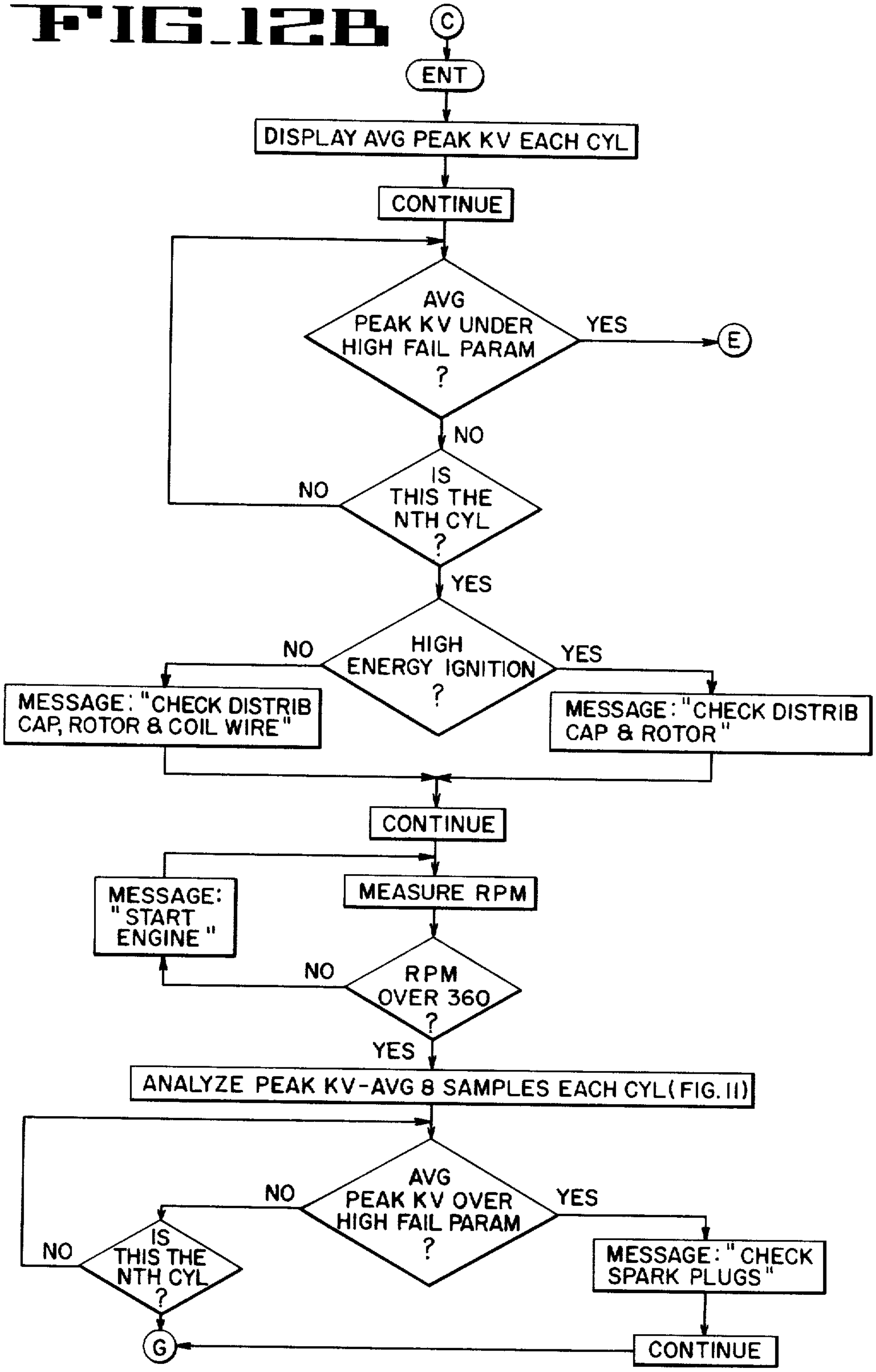

Returning to the condition where the average peak kilovolt readings are either higher then the arbitrarily high fail parameter or higher than the sliding high parameter, the routine is picked up at C in FIG. 12B. The average peak kilovolts for each cylinder are displayed to the operator. When the operator has observed this display, a "continue" key is depressed by the operator and the processor then determines whether the average peak kilovolt reading is less than the arbitrarily set high fail parameter. In the event it is less, the process proceeds to point E seen in FIG. 12C. However, if the average peak kilovolt reading is not underneath the arbitrarily high set fail parameter then the peak kilovolt characteristic is too high. For those cylinders having peak kilovolt readings over the high absolute limit, the processor makes a determination as to whether the ignition system is a high energy system or not. In the event that it is, a message as displayed to the operator to "check the distributor cap and the rotor". In the event it is not a high energy ignition system the message displayed to the operator requires him to "check the distributor cap, rotor and the coil wire".

Upon absorbing the appropriate message, the operator is required to depress a "continue" key as seen in FIG. 12B, whereupon the processor 26 measures engine RPM and determines whether the RPM exceeds 360. In the event the engine speed is less than 360 RPM the operator is instructed by the processor through the display to start the engine. The processor again measures the RPM and when it exceeds 360 the processor runs through the secondary wave peak kilovolt analysis as depicted in FIG. 11. The newly acquired test results are observed by the processor and if the average peak kilovolt reading is over the arbitrarily set high fail parameter then a message is displayed to the operator to "check the spark plugs". If the average peak kilovolts measured do not exceed the high fail parameter then the next cylinder is observed until a determination is made for each cylinder as to whether the peak kilovolt readings exceed the absolute high limit represented by the high fail parameter. After the data for the last cylinder is observed by the processor 26, the routine is returned to the beginning at G as seen in FIG. 12A.

Figure 12C:
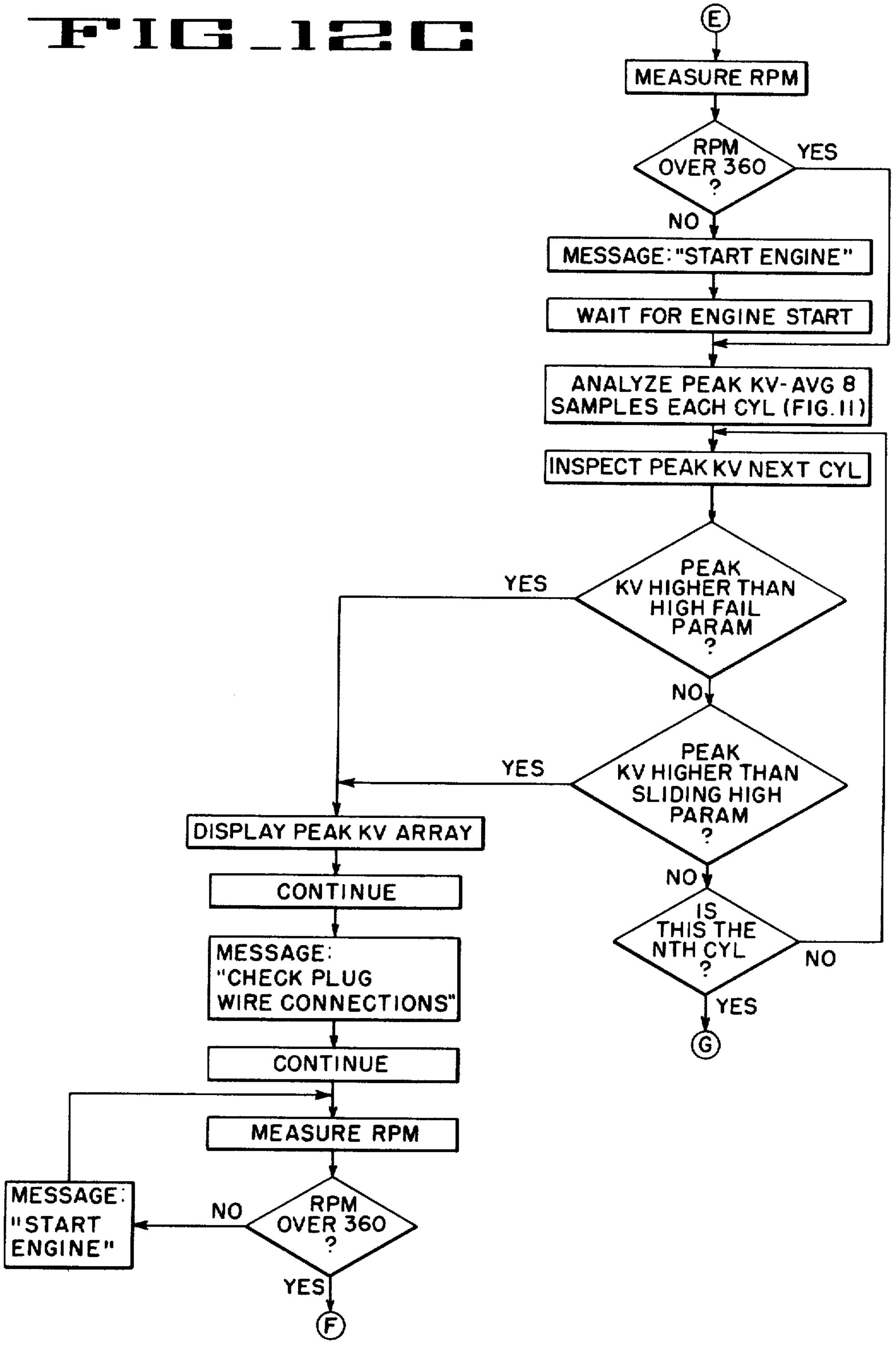

The routine from E in FIG. 12B is picked up in FIG. 12C wherein the engine RPM is measured. Once the engine speed is determined to be over 360 RPM the average peak kilovolt analysis described in conjunction with FIG. 11 is undertaken by the processor. The peak kilovolt reading for each cylinder is inspected and the processor determines if the reading is either higher than the arbitrarily set high fail parameter or the sliding high parameter. If all readings are less than these high references then the routine is reinitiated at G as seen in FIG. 12A. If some of these readings exceed either of the high limits then the processor causes the entire peak kilovolt array to be displayed to the operator. The operator observes the array so that he may see any unusually high signals. The operator is called upon to depress a "continue" key, whereupon a message is displayed requiring him to "check the plug wire connections". Having accomplished the foregoing, the operator is again required to depress a "continue" key and the engine RPM is measured and instructions provided to the operator to "start the engine" so that the engine ultimately exceeds 360 RPM.

Figure 12D:
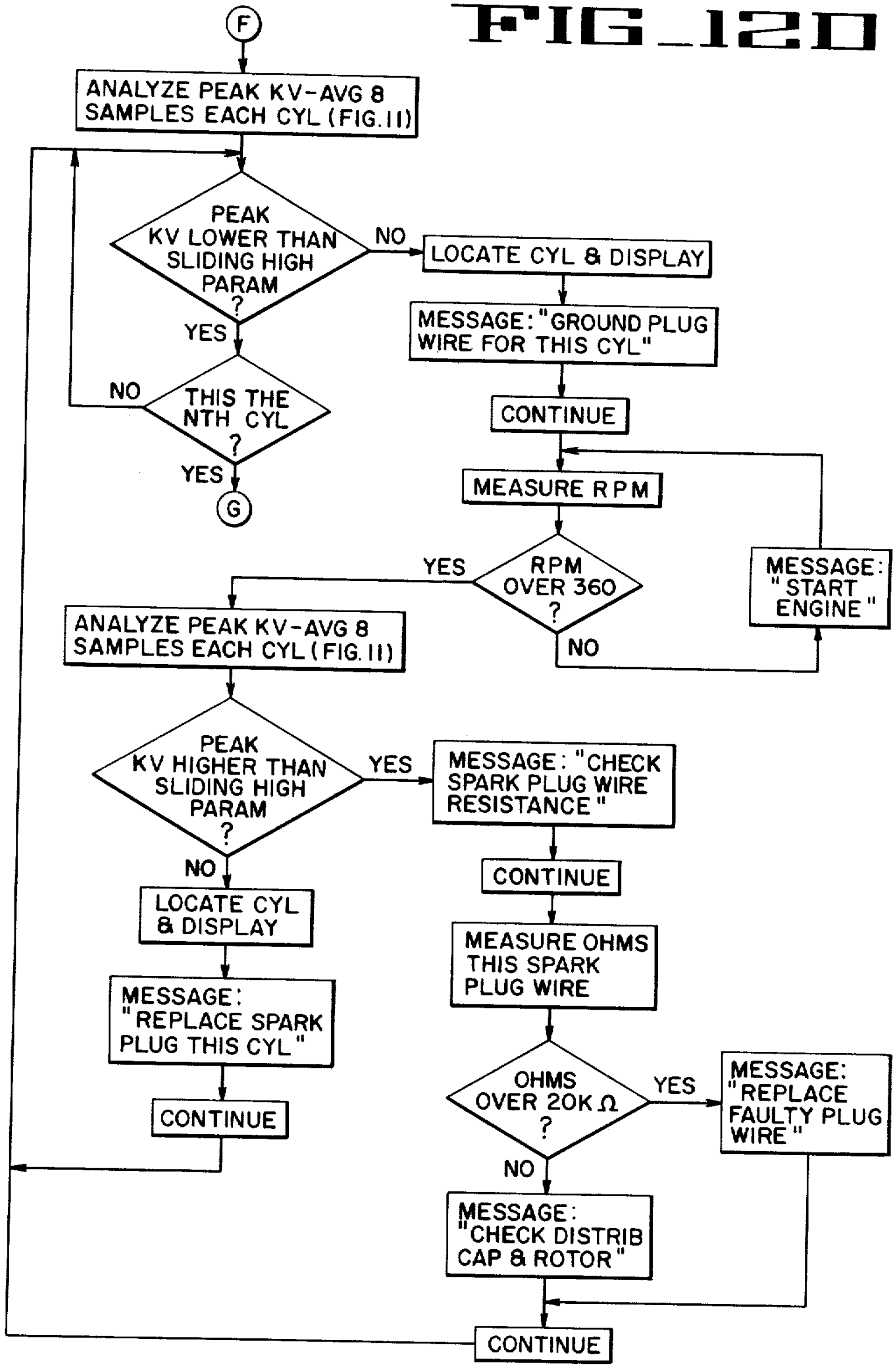
Figure 12E:
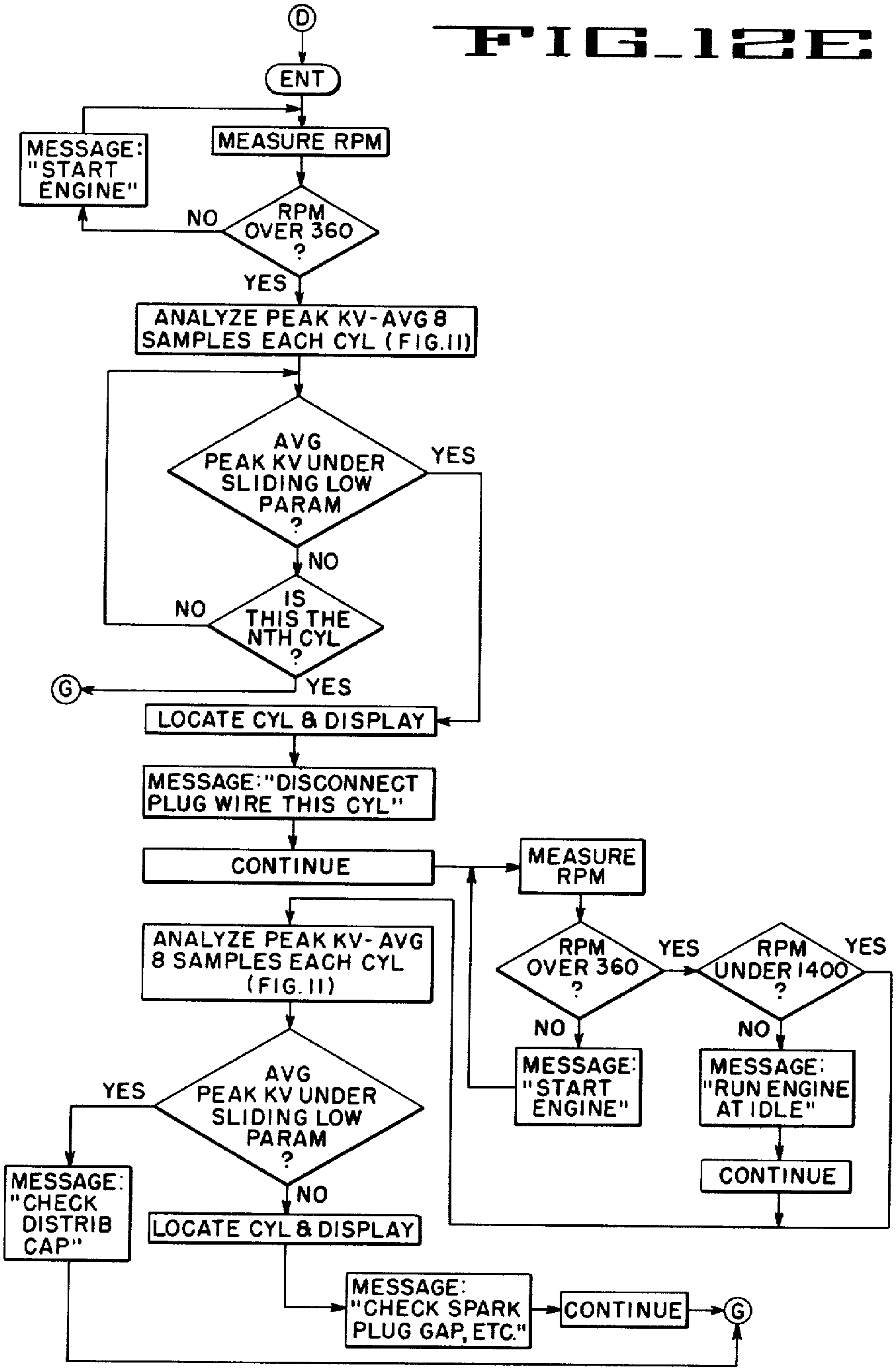

The routine continues as shown in FIG. 12D at point F wherein the analysis depicted in the flow diagram of FIG. 11 is again undertaken. The processor now determines whether the average peak kilovolt readings in each cylinder are lower than the sliding high parameter. If the answer is "yes" the next cylinder is observed until all cylinders have been inspected by the processor and the routine is returned to G in FIG. 12A. If the average peak kilovolt readings in some cylinders are not lower than the sliding high parameter, then the high reading cylinder or cylinders are located and the cylinder identification displayed. A message is provided for the operator to "ground the plug wire for this cylinder". Upon accomplishing the foregoing task, the operator is required to press the "continue" key and the processor observes the engine RPM. If the RPM is not above 360 the operator is required to start the engine until the RPM level is exceeded. Thereafter, the average peak kilovolt analysis is performed as shown in the flow diagram of FIG. 11 and again the data obtained for each cylinder is inspected to see if the peak kilovolt measurements are higher than the sliding high parameter. If the average peak kilovolt readings are not higher (lower) then that cylinder is located and displayed. A message is displayed for the operator to "replace the spark plug for the cylinder". This repair is undertaken because the spark plug is a grounding device and the fact that the average peak kilovolt reading for this particular cylinder is now less than the sliding high parameter indicates that the secondary energy is being dissipated through some path other than the path across the spark cap.

Upon accomplishing the required repairs the peak kilovolt reading for the next cylinder is observed. If the average peak kilovolt reading is higher than the sliding high parameter as determined from the last mentioned peak kilovolt measurement according to FIG. 11, then the message is displayed to "ground the plug wire for this cylinder". Upon accomplishing the task indicated by the instructions the operator is required to depress the "continue" key whereupon another peak kilovolt measurement in accordance with the sequence of FIG. 11 is made and if the measurement is still higher than the sliding high parameter a message to "check spark plug resistance wire" is displayed. After selecting "continue" an ohm meter is connected across the length of the spark plug wire. When the spark plug wire resistance is entered into the system and if the resistance is over 20,000 ohms, a message is displayed to the operator to "replace faulty spark plug wire". If the resistance is less than 20,000 ohms a message is displayed to the operator to "check distributor cap and rotor". Upon completion of either one of the immediately foregoing instructions, the operator is required to depress the "continue" key and the routine is returned to look at the average peak kilovolt reading for the next cylinder in the engine as indicated in FIG. 12D.

Returning now to FIG. 12A it may be seen that when the processor 26 makes a determination that the average peak kilovolt reading for a particular cylinder is lower than the sliding low parameter a routine is picked up at D in FIG. 12E. The engine RPM is measured and the processor requires through a visual display to the operator that the engine be started if the engine speed is not over 360 RPM. With the engine running, the average peak kilovolt analysis depicted in the flow diagram of FIG. 11 is performed and the processor then determines whether or not the average peak kilovolt reading is under the sliding low parameter. If it is less than the sliding low parameter than the low cylinder is located and displayed to the operator. A message is also displayed to the operator which requires "disconnect plug wire for this cylinder". After the instructions have been followed the operator is required to press the "continue" key, whereupon the engine RPM is once again measured to determine if it is above 360 RPM. The processor then determines if the engine speed is below 1400 RPM. If the engine speed is higher than 1400 RPM then the operator is instructed to run the engine at idle. When the operator has followed the processor instructions and is running the engine at idle speed, the average peak kilovolt analysis of FIG. 11 is again performed. Again the processor makes a determination as to whether the average peak kilovolt reading is under the sliding low parameter. If it is, the operator is instructed by the system display to "check the distributor cap" after which the routine is returned to point G in 12A. If the average peak kilovolt reading is not under the sliding low parameter, then the cylinder being tested is located and displayed. An instruction message to "check the spark plug gap" is displayed to the operator. Thereafter the "continue" key is pressed and the routine returns to point G in FIG. 12A.

It may be seen in FIG. 12E that if the average peak kilovolt reading for the last cylinder is under the sliding low parameter when the question is first put in FIG. 12E, the routine returns to point G in FIG. 12A.

Although the best mode contemplated for carrying out the present invention has been herein shown and described, it will be apparent that modification and variation may be made without departing from what is regarded to be the subject matter of the invention.

What is claimed is:

1. An internal combustion engine wave characteristic analyzer for a two dimensional wave signal representative of an operating characteristic of the engine wherein predetermined wave characteristic data are held in storage, comprising means for receiving the wave signal and for providing a plurality of sampled output signals corresponding to wave characteristics at a plurality of positions along the length of the wave, means for receiving and storing data indicative of said plurality of output signals, means for continuously performing analysis of ones of said plurality of output signal data utilizing others of said plurality of output signal data and ones of said predetermined wave characteristic data, thereby providing a discrete analysis signal, means for continuously receiving and diagnosing the engine operating characteristic in view of said discrete analysis signal and for providing a diagnostic signal for the engine operating characteristic responsive thereto, means coupled to said diagnostic signal for providing an instruction output relating to operations required to retain and reestablish the predetermined wave characteristic, and means for alphanumerically displaying said instruction output.

2. A wave characteristic analyzer as in claim 1 wherein said means for receiving the wave signal comprises analog circuitry including means for processing sampled analog wave signals.

3. A wave characteristic analyzer as in claim 1 wherein said means for continuously performing analysis comprises a processor in communication with said means for receiving and storing.

4. An engine analyzer for determining characteristics of a two dimensional wave signal associated with an internal combustion engine, comprising means for sampling a plurality of the wave signals at a controlled sample point on the wave signals and for providing a signal amplitude measurement at the sample point along the length of the wave, means for storing an indication of each of said amplitude measurements, means for processing ones of said signal amplitude measurements to obtain at least one reference indication, means for comparing ones of said stored indications with said reference indication, thereby providing a comparison signal, a processor connected to receive said comparison signal, said processor being coupled to a diagnosis storage, means for fetching analysis information from a predetermined location in said diagnosis storage corresponding to said comparison signal, said analysis information including instructions for altering the wave characteristics to obtain predetermined wave characteristics, and means for displaying said instructions.

5. An engine analyzer as in claim 4 wherein said means for sampling comprises a threshold detection circuit for determining the position along the length of the ignition wave where predetermined signal levels are crossed.

6. An engine analyzer as in claim 5 wherein said threshold detection circuit comprises means for changing threshold sensitivity, said last named means being programmable by said processor.

7. An engine analyzer as in claim 4 wherein the two dimensional wave signal is an engine ignition wave obtained from a conventional points, capacitor and coil type ignition, and wherein said means for sampling comprises a threshold detector for sensing when the ignition points close and open and for providing a binary signal having one state when points are closed and another state when points are open, and means for averaging the binary signal, whereby a signal corresponding to points dwell is obtained.

8. An engine analyzer as in claim 4 wherein said means for sampling comprises an analog signal conditioning circuit for receiving the waveform, said processor providing a command signal coupled to said signal conditioning circuit, said command signal operating to control the position of the sample point.

9. An engine analyzer as in claim 8 wherein said means for sampling is commanded by said processor to obtain additional amplitude measurements from each of the waveforms, said processor operating to control the position of said additional amplitude measurements in accordance with said command signal.

10. A wave characteristic analyzer for periodic waveforms generated by and representative of operating characteristics of an internal combustion engine and peripheral equipment associated therewith, comprising means for receiving each wave signal and for providing first and second sampled output signals corresponding to the wave characteristics at first and second sample points respectively along the length of the wave, means for receiving and storing data indicative of said first and second sampled output signals, means for comparing said stored data obtained from successive ones of said periodic waveforms and relating to said sampled output signals thereby providing an analysis signal, a processor for receiving and diagnosing the operating characteristics in accordance with said analysis signal and for providing a diagnostic signal related thereto, said processor further operating to select said first and second sample points.

11. A wave characteristic analyzer as in claim 10 wherein said means for receiving each wave signal comprises an analog circuit.

12. A wave characteristic analyzer as in claim 11 wherein said analog circuit includes a threshold detector circuit.

13. A wave characteristic analyzer as in claim 11 wherein said analog circuit includes a waveform peak detection circuit.

14. A wave characteristic analyzer as in claim 10 wherein the waveform has predetermined desired characteristics, together with means coupled to receive said diagnostic signal for providing an instruction output relating to operations required to retain and reestablish the predetermined wave characteristics, and means for displaying said instruction output.

15. An analyzer for use by an operator in determining deviations from normal characteristics of a two dimensional waveform signal produced by a machine wherein the waveform signal has a substantially predetermined shape for normal operation of the machine, comprising means for receiving and for conditioning the waveform signal, means coupled to said means for receiving for sampling said conditioned waveform signal, for providing data signals corresponding to said waveform samples, for continuously processing said data signals, for continuously controlling said means for receiving and conditioning, and for continuously diagnosing deviation of said data signals from the normal waveform characteristics utilizing others of said data signals, means coupled to said means for diagnosing for providing instructions for machine repairs to maintain and reestablish normal waveform characteristics, and means for communicating said instructions to the operator.

16. An analyzer as in claim 15 wherein said means for receiving comprises an analog circuit, and wherein said means coupled to said means for receiving includes means for digitizing said data signals and providing digitized data.

17. An analyzer as in claim 15 wherein said machine is an internal combustion engine having an ignition system including points, condensor and coil, and wherein the waveform signal is an engine ignition waveform, said data signal comprising an analog signal obtained when the points are closed, whereby points resistance is measured and said instructions relate to replacement and repair of the ignition points.

18. An analyzer as in claim 15 wherein said machine is an internal combustion engine having an ignition system including points, condensor and coil and wherein said data signals are peak kilovolt signals, said means for providing instructions providing instruction for replacement and repair of the coil, ignition conductors and condensor.

19. An analyzer as in claim 15 wherein the machine is an internal combustion engine having ignition points, wherein said means for sampling provides said data signals when the points are in the process of opening, thereby providing a points arcing signal, said means for providing instructions for machine repair referring to replacement and repair of ignition points.

20. An analyzer as in claim 15 wherein the machine is an internal combustion engine having ignition points, wherein said data signals are indicative of points dwell, together with an averaging circuit coupled to receive said data signals, said means for providing instructions for machine repair referring to replacement and repair of ignition points.

21. An analyzer for use by an operator in determining deviation from normal characteristics of an internal combustion engine ignition waveform wherein the engine ignition system includes ignition points, coil and spark plugs and the engine specifications are entered into a memory, comprising means for sampling the ignition waveform in accordance with a selected diagnosis, thereby providing a sampled signal, means for conditioning said sampled signal providing a data signal, means for digitizing said data signal providing digitized data, a data memory connected to store and digitized data, means for continuously processing said digitized data, for continuously controlling said means for sampling, conditioning and digitizing, and for continuously diagnosing the deviation of said data from characteristics corresponding to normal waveform characteristics with reference to the stored engine specifications and said store digitized data, means coupled to said means for diagnosing for providing instructions for repairs to maintain and reestablish normal waveform characteristics, and means for communicating said instructions for maintenance and repair to the operator.

22. An analyzer as in claim 21 wherein said means for sampling and conditioning are analog circuits.

23. An analyzer as in claim 21 wherein an engine speed synchronizing signal is provided and wherein said means for continuously processing, controlling and diagnosing is sychronized with engine speed.

24. An analyzer as in claim 21 wherein said waveform signal is sampled throughout ignition point closure, whereby said instructions relate to maintenance and repair of the ignition points.

25. An analyzer as in claim 21 wherein said waveform signal is sampled during peak firing voltage, whereby said instructions relate to maintenance and repair of the coil and spark plugs.

26. An analyzer as in claim 21 wherein said waveform signal is sampled during ignition point dwell whereby said instructions relate to maintenance and repair of ignition points.

27. An analyzer as in claim 21 wherein said waveform signal is sampled at the termination of ignition point dwell, whereby said instructions relate to maintenance and repair of ignition points.

28. An analyzer for determining deviation from normal characteristics of an ignition waveform produced by an internal combustion engine ignition system, wherein the ignition system contains ignition points, distributor, coil, condensor, spark plugs and ignition system conductors, and wherein engine identification code is entered into a memory, comprising a first electrical circuit coupled to receive the ignition waveform and providing a peak signal indicative of the maximum ignition system firing voltage, a second electrical circuit coupled to receive said peak signal and the ignition waveform providing a digitized data signal, a digitized data signal store, a third electrical circuit coupled to receive the ignition waveform and providing an output indicative of passage of the ignition waveform through a predetermined threshold level, a processor connected to receive said digitized data and theshold output operating to continuously control said first, second and third electrical circuits so that preselected cylinder waveforms are coupled thereto and preselected threshold levels are set therein, said processor further operating to scrutinize said digitized data and threshold output with reference to store digitized data and the engine identification code and to thereby provide an instruction output for maintenance and repair of the engine ignition system, and means for communicating said instruction output to an analyzer operator.

29. An analyzer as in claim 28 together with an averaging circuit coupled to receive said threshold output whereby a points dwell signal is provided.

* * * * *